United States Patent
Baur

(10) Patent No.: US 6,499,907 B1
(45) Date of Patent: Dec. 31, 2002

(54) CONNECTING MEANS FOR THE RELEASABLE CONNECTION AND METHOD FOR RELEASING A CONNECTION BETWEEN A FIRST COMPONENT AND A SECOND COMPONENT

(76) Inventor: Franz Baur, Kalzhofen 53, D-87534 Oberstaufen (DE)

( * ) Notice: Subject to any disclaimer, the term of this patent is extended or adjusted under 35 U.S.C. 154(b) by 0 days.

(21) Appl. No.: 09/641,778

(22) Filed: Aug. 18, 2000

Related U.S. Application Data

(63) Continuation of application No. PCT/EP99/01064, filed on Feb. 18, 1999.

(30) Foreign Application Priority Data

Feb. 24, 1998 (DE) .......................................... 198 07 663

(51) Int. Cl.[7] ................................................ F16L 41/00
(52) U.S. Cl. ................................ 403/188; 403/DIG. 1
(58) Field of Search ............................ 403/DIG. 1, 188

(56) References Cited

U.S. PATENT DOCUMENTS 4,274,444 A * 6/1981 Ruyak ............... 403/DIG. 1 X
5,788,402 A * 8/1998 Banda et al. ...... 403/DIG. 1 X

FOREIGN PATENT DOCUMENTS

| CH | 381921 | 11/1964 |
|---|---|---|
| DE | 1 032 036 | 11/1958 |
| DE | 43 36 796 | 12/1994 |
| DE | 295 05 752 | 7/1995 |
| DE | 296 20 785 | 8/1997 |
| EP | 0 344 120 | 11/1989 |

* cited by examiner

Primary Examiner—Lynne H. Browne
Assistant Examiner—Ernesto Garcia
(74) Attorney, Agent, or Firm—Barry R. Lipsitz

(57) ABSTRACT

In order to provide a connecting means for the releasable connection of a first component and a second component, in particular, for the releasable connection of furniture and machine parts, comprising a first connecting element arranged on the first component and a second connecting element arranged on the second component, wherein the first connecting element and the second connecting element are releasably connected to one another in the connected state of the components and one of the connecting elements comprises a retaining part which interacts with the other one of the connecting elements in a retaining position such that any relative movement of the first connecting element and the second connecting element along a direction of connection is prevented and which allows a relative movement of the first connecting element and the second connecting element along the direction of connection in a release position, which makes a reliable releasable connection of two components with one another possible without weakening the relevant components unnecessarily due to channels it is suggested in accordance with the invention that the retaining part be movable from the retaining position into the release position by means of a driving magnetic field variable with time and acting on the connecting means from outside the connecting means.

59 Claims, 13 Drawing Sheets

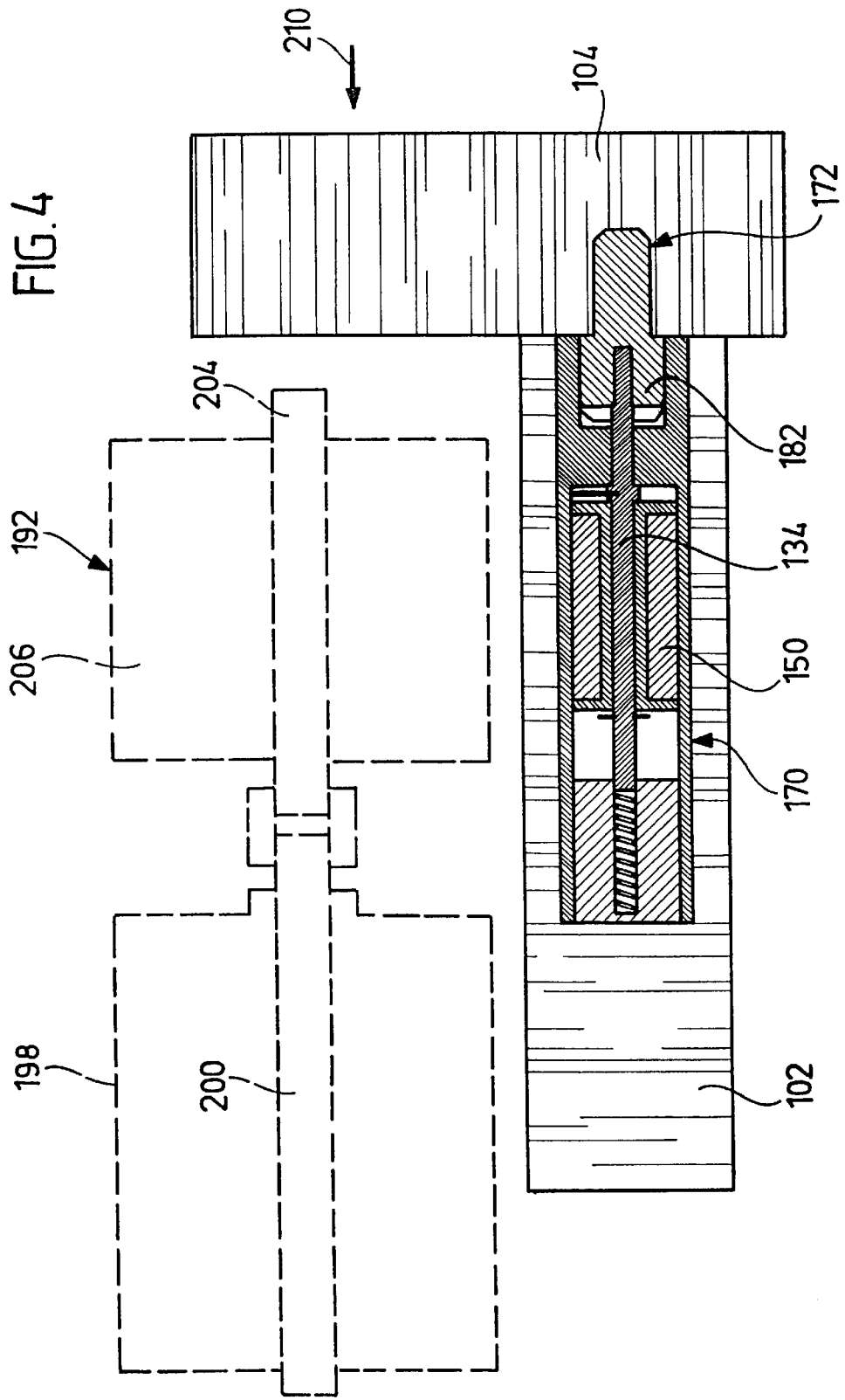

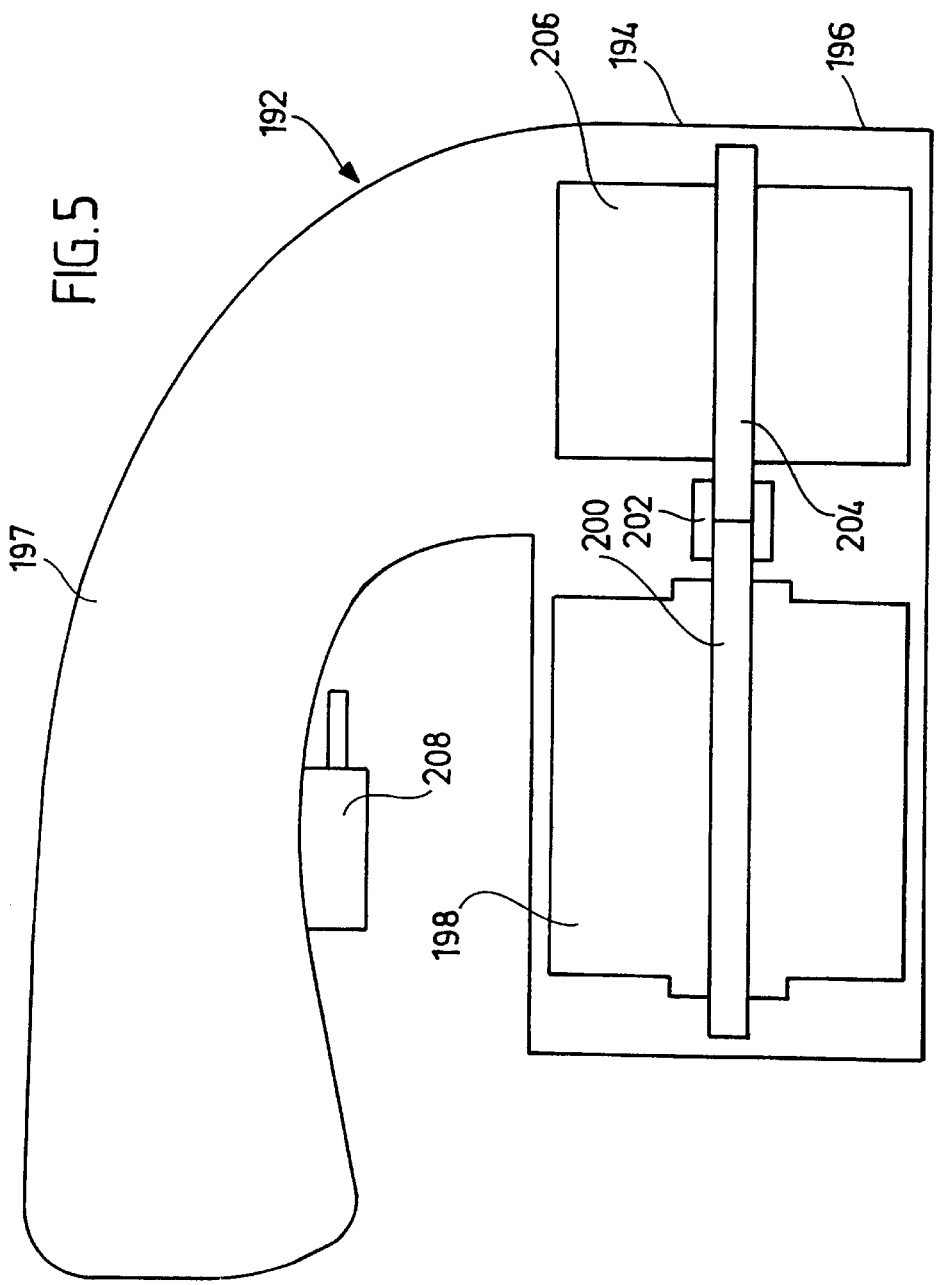

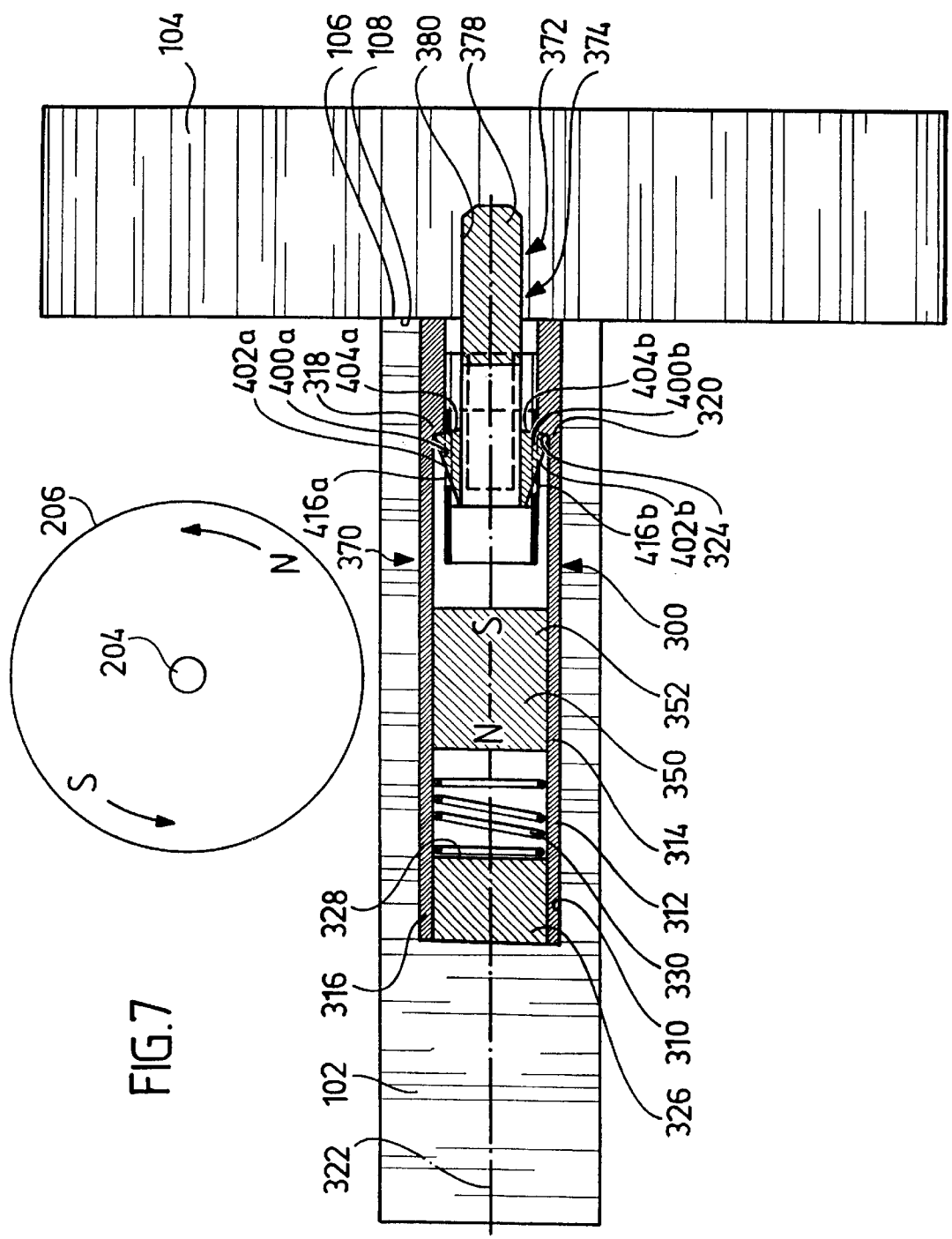

CONNECTING MEANS FOR THE RELEASABLE CONNECTION AND METHOD FOR RELEASING A CONNECTION BETWEEN A FIRST COMPONENT AND A SECOND COMPONENT

This application is a continuation of international application number PCT/EP99/01064 filed on Feb. 18, 1999.

The invention relates to a connecting means for the releasable connection of a first component and a second component, in particular, for the releasable connection of furniture or machine parts, comprising a first connecting element arranged on the first component and a second connecting element arranged on the second component, wherein the first connecting element and the second connecting element are releasably connected to one another in the connected state of the components and one of the connecting elements comprises a retaining part which, in a retaining position, interacts with the other one of the connecting elements such that any relative movement of the first connecting element and the second connecting element along a direction of connection is prevented and which, in a release position, allows a relative movement of the first connecting element and the second connecting element along the direction of connection.

Furthermore, the present invention relates to a method for releasing a connection between a first component, on which a first connecting element is arranged, and a second component, on which a second connecting element is arranged, wherein one of the connecting elements comprises a retaining part which, in a retaining position, interacts with the other one of the connecting elements such that any relative movement of the first connecting element and the second connecting element along the direction of connection is prevented, and wherein to release the connection the retaining part is moved from the retaining position into a release position, in which the retaining part allows a relative movement of the first connecting element and the second connecting element along the direction of connection.

Such connecting means and methods are known.

It is known, in particular, to use cabinet catches each comprising an eccentric disk and a stay bolt for the releasable connection of furniture components.

With the known connecting means it is of disadvantage that the retaining part is moved into the release position by means of a tool which engages in the connecting means and so direct access to the connecting means must be provided for the tool.

Particularly in the case of cabinet catches which comprise eccentric disks and stay bolts the components to be connected to one another are weakened by the crossing bores required in these components in such a manner that with the slightest load, in certain circumstances even during normal use of the furniture, the connection will break down due to the connecting elements breaking out of the respectively associated component. Since the eccentric disk absorbs the transferable traction force of the connection due to stress on the wall of the component hole, into which the eccentric disk is inserted, by way of bearing tension, a minimum distance between the eccentric disk and a contact surface, with which the component accommodating the eccentric disk abuts on the additional component, is necessary in order to ensure that the admissible limit shearing strain of the material of this component is not exceeded. On account of this minimum distance the stay bolt which engages in the eccentric disk in the connected state must be of such a length that it is susceptible to breaking out of the component, in which it is accommodated, when any lateral impact occurs. Furthermore, the spatially varying bearing tension at the wall of the hole, in which the eccentric disk is accommodated, leads to tilting of the eccentric disk which may result in the eccentric disk protruding beyond the component, in which it is accommodated.

A further disadvantage of the known connecting means consists in the fact that these always remain at least partially visible even in the connected state of the components on account of the direct access required for the tool, which impairs the optical impression of the piece of furniture produced from these components or the machine produced from these components.

The object underlying the present invention is therefore to provide a connecting means of the type specified at the outset which makes a reliable releasable connection of two components with one another possible without weakening the relevant components unnecessarily due to channels.

This object is accomplished in accordance with the invention, in a connecting means having the features of the preamble to claim 1, in that the retaining part can be moved from the retaining position into the release position by means of a driving magnetic field which acts on the connecting means from outside the connecting means and is variable with time.

The inventive concept offers the advantage that the retaining part can be moved into the release position without a direct mechanical engagement in the connecting means being required. On the contrary, the movement of the retaining part is brought about from outside the connecting means without any direct contact of a corresponding drive device with the connecting means being necessary.

Consequently, it is no longer necessary to provide direct access to the connecting means for a tool through one of the components connected to one another for the mechanical actuation of the retaining part. Since, as a result, additional access passages or access bores can be dispensed with, the components connected to one another are not weakened unnecessarily by additional channels.

Furthermore, no visible connecting elements or cover flaps impair the optical appearance of the product assembled from the components, for example, the finished piece of furniture.

In the field of mechanical engineering, connections may be realized by means of the inventive connecting means, with which an additional channel in the component surfaces has to be avoided for constructional reasons. Furthermore, it is also possible to connect an additional component when it is no longer possible to connect an additional component by means of one of the known connecting means due to components already connected.

As a result of the fact that it is no longer necessary to have crossing bores at the edge of the components to be connected, these components are weakened to a lesser extent. The risk of the connecting elements breaking out of the components is thus reduced.

In order to establish the releasable connection between the two components to be connected to one another, a driving magnetic field is not absolutely necessary. On the contrary, it may be provided for the retaining part to be movable from the release position into the retaining position, for example, by means of elastic forces during the establishment of the connection.

In a preferred development of the inventive connecting means it is, however, provided for the retaining part to be movable from the release position into the retaining position by means of a driving magnetic field. As a result, any unintentional establishment of the connection between the two components can be prevented.

No further details have so far been given concerning the type of time variation of the driving magnetic field.

It is, for example, possible for the retaining part to be movable by means of a rotating driving magnetic field. Such a rotating driving magnetic field can interact directly with a magnetic element comprising a magnet in order to cause this to move.

Alternatively or supplementary hereto, it may also be provided for the retaining part to be movable by means of a driving magnetic field with an amplitude variable with time. In particular, an alternating magnetic field which varies periodically and with time can be used. An induction current, which can be used for bringing about the movement of the retaining part into the release position, can, for example, be generated in the connecting means by means of such a driving magnetic field.

In principle, it is possible for the retaining part to be movable directly as a result of interaction of the retaining part with the driving magnetic field.

In preferred developments of the invention, it is, however, provided for the connecting means to comprise a coupling means, as a result of the interaction of which with the driving magnetic field the retaining part is movable indirectly.

Such a coupling means may, for example, comprise a unit for generating an induction current as a result of interaction with the driving magnetic field.

This induction current may be used, for example, to operate a heating element which can be fed with the induction current.

In this case, it may be provided, in particular, for the retaining part to comprise an element deformable due to temperature variation, preferably a bimetallic strip. In this case, the retaining part can be moved from the retaining position into the release position due to deformation of the element deformable due to temperature variation when the heating element is fed with the induction current generated as a result of interaction with the driving magnetic field.

Alternatively or supplementary to driving the retaining part as a result of induction, it may also be provided for the coupling means to comprise a magnetic element which can be driven by means of the driving magnetic field to perform a movement within the connecting means. The movement of the magnetic element is thereby brought about by a direct magnetic interaction of the magnetic element with the driving magnetic field.

The movement of the retaining part can, in this case, be brought about directly as a result of interaction of the retaining part with the magnetic element.

It may, in particular, be provided for the magnetic element to have an entraining element which interacts with a suitable entraining element of the retaining part such that the movement of the magnetic element brought about by the driving magnetic field can be transferred to the retaining part.

In a preferred development of the invention it is provided for the magnetic element to be drivable by means of the driving magnetic field to perform a rotary movement. This rotary movement can then be transferred to the retaining part so that the retaining part can be turned into the retaining position.

It is particularly favorable when the magnetic element can be driven to perform an oscillating rotary movement. In this case, the magnetic element can be moved away from the retaining part when the retaining part is jammed in a blocked position in order to subsequently be accelerated by the driving magnetic field over a large rotary angle and to be able to transfer a correspondingly large momentum to the retaining part so that the retaining part is released from the blocked position. As a result of this effect similar to a sledge hammer or drive screw a considerable torque can be transferred to the retaining part so that a retaining part securely turned into the other connecting means can also be released from the retaining position in this manner.

It is particularly favorable when the rotary angle which can be covered by the magnetic element during the oscillating rotary movement is more than approximately 90°, preferably more than approximately 150°. The larger the rotary angle which the magnetic element can cover during the rotary movement, the longer the path of acceleration for the magnetic element and the greater the momentum which can be transferred from the magnetic element to the retaining element.

In a preferred development of the invention a magnetic element is used which comprises a permanent magnet magnetized transversely to the longitudinal axis of the magnetic element. Such a magnetic element may be driven in a simple manner to perform a rotary movement about its longitudinal axis as a result of interaction with a rotating driving magnetic field and this movement requires less space in the connecting means than would be the case for a rotation of the magnetic element about a transverse axis thereof.

Instead of a direct interaction of the magnetic element with the retaining part, it may also be provided for the coupling means to comprise an unlocking element which can be moved into an unlocking position as a result of interaction with the magnetic element, wherein the retaining part is located in the release position when the unlocking element is in the unlocking position.

Instead of a rotary movement, the magnetic element can also be drivable to perform a linear movement by means of the driving magnetic field.

It is particularly favorable when the magnetic element can be driven to perform a linear reciprocating movement. When the retaining part and/or an unlocking element which is present where applicable are located in a blocked position, the magnetic element can, in this case, be released from the retaining part and the unlocking element, respectively, in order to again be accelerated by the driving magnetic field and to achieve an adequately large momentum which is sufficient to release the retaining part and/or the unlocking element from the blocked position.

In order to bring about a linear movement of the magnetic element it is of advantage when the magnetic element comprises a permanent magnet magnetized essentially parallel to the longitudinal axis of the magnetic element.

Furthermore, it is of advantage when the coupling means comprises an elastic element for reversing the direction of movement of the magnetic element. Such an elastic element can store the kinetic energy of the magnetic element as elastic energy during the reversal procedure and transfer this energy again to the magnetic element after a completed reversal of the direction of movement in order to accelerate this magnetic element, in addition.

In a preferred development of the inventive connecting means it is provided for the retaining part to comprise a shaft with a thread, preferably an external thread. If the retaining part is screwed by means of a thread into a corresponding counterthread of the other connecting element, large traction forces can be absorbed by the connecting means which allows the surfaces, on which the components to be connected to one another abut on one another, to be securely tightened against one another so that no gap remains between the components.

In the case of the known connecting means, in particular, in the case of a connecting means comprising an eccentric disk and a stay bolt this is mostly not possible because the area of the edge of the component including the eccentric disk, which is weakened due to the crossing bores, is not in a position to activate the necessary reaction tensions without thereby being deformed to a considerable degree. This results in the weakened edge area breaking down before the contact surfaces of the components to be connected to one another touch.

Alternatively or supplementary to a thread, the retaining part may be provided with a locking tongue which is locked to the other connecting element in the retaining position of the retaining part.

In order to be able to bring the components to be connected to one another into engagement with one another before the retaining part is moved into the retaining position, the retaining part is preferably mounted in one of the connecting elements for displacement along the direction of connection.

It is particularly favorable when the retaining part is spring mounted in one of the connecting elements. As a result, any damage to the retaining part while the two components are being brought together prior to establishing the connection can be avoided at the same time and the retaining part can be pretensioned against the other connecting element which facilitates the movement of the retaining part into the retaining position.

In order to avoid the connecting means becoming visible after establishment of the connection between the components and to prevent an unsightly gap resulting between the components in the connected position, it is of advantage when the connecting elements can be secured in the first component and in the second component, respectively, such that outer surfaces of these components abut on one another in the connected position.

It may, in particular, be provided for one of the connecting elements or both connecting elements to be anchored in the associated component by means of a respective outer thread. In this case, a transfer of force between the respective connecting element and the associated component extending over many thread flanks is provided for in the assembled state, in which the connecting elements are secured in the associated component, and so the occurrence of local peak tensions, which exceed the admissible material parameters of the respective component, is avoided.

A visibility of the connecting means in the connected state of the components may be avoided, in particular, due to the fact that one of the connecting elements has a receiving means, into which the other connecting element dips at least partially in the connected position.

If it is advantageously provided for the other connecting element to abut areally on an inner wall of the receiving means in the connected position, wherein the normal to surface of the inner wall is aligned transversely to the direction of connection, the connection established between the components by means of the inventive connecting means can absorb considerable shearing forces.

Known connecting means, in particular, connecting means comprising an eccentric disk and a stay bolt are not in a position to do this because the required, crossing bores weaken at least one of the components too greatly and so additional dowels are necessary for the transfer of shearing forces and this entails additional resources of time and costs for the production of the connection.

In preferred developments of the invention it is provided for at least one of the connecting elements to comprise an anchoring part which is anchored in the associated component in the assembled state and a connecting part which projects beyond an outer surface of the associated component and for the connecting part to have a smaller extension in the direction of connection than the anchoring part. As a result of this design, the connecting element anchored in the associated component becomes unsusceptible with respect to lateral impact. Such lateral impact occurs frequently, for example, during the assembly of a piece of furniture when a furniture component with stay bolts screwed into it falls over due to carelessness and thereby falls onto one of these stay bolts. With the known connecting means which, as already explained above, comprise stay bolts projecting of necessity to a considerable extent beyond the outer surface of the associated component such an impact often leads to the stay bolts breaking out of the associated component.

No further details have so far been given concerning the type of generation of the driving magnetic field.

In one embodiment, a drive device is provided for releasing a connection between the first component and the second component established by means of an inventive connecting means, this device comprising a means for generating the driving magnetic field variable with time, by means of which the retaining part can be moved from the retaining position into the release position.

Such a drive device is preferably designed so as to be transportable in order to be brought in a simple manner to the respective assembly location of the two components and to be positioned relative to the connecting means in a suitable manner.

The handling capability of the drive device is facilitated when this is advantageously provided with a handle.

In order to be able to drive a magnetic element provided in the connecting means to perform a movement in the connecting means, the drive device advantageously comprises a means for generating a rotating driving magnetic field.

In order to be able to use the drive device not only for establishing but also for releasing the connection between the components, the direction of rotation of the driving magnetic field is preferably reversible.

It is possible to generate a rotating driving magnetic field in a particularly simple manner when the drive device comprises a rotatable driving magnet and a motor for bringing about a rotary movement of the driving magnet.

In order to keep the space required in the drive device for the rotary movement of the driving magnet as small as possible, it is preferably provided for the driving magnet to be essentially cylindrical and magnetized transversely to its longitudinal axis.

Alternatively or supplementary to a rotatable driving magnet it may also be provided for the drive device to have a coil arrangement which comprises several coils which are preferably aligned antiparallel to one another and can be supplied by means of a suitable control circuit with coil currents variable with time such that the driving magnetic field resulting due to superposition of the individual coil magnetic fields is variable with time in the desired manner, in particular, essentially carries out a linear or a rotary movement.

In a preferred development of the inventive drive device it is provided for a periodically variable driving magnetic field to be generated by the means for generating the driving magnetic field, the frequency of this magnetic field corresponding essentially to a resonance frequency of a coupling means of the connecting means, as a result of the interaction of which with the driving magnetic field the retaining part can be moved. The resonance frequency of the coupling means is thereby to be understood as that frequency of an oscillating movement of the coupling means driven by means of the driving magnetic field, with which the momentum transferred from the driving magnetic field to the coupling means is at a maximum.

As a result, it is possible to release the retaining part in a particularly efficient manner from blocked positions, in which the retaining part is stuck, on its way from the retaining position into the release position.

In order to avoid the retaining part being brought during the establishment of the connection between the components into a retaining position, in which it is so rigidly anchored that it can no longer be released from the retaining position by means of the drive device, the drive device can preferably be switched into an operating state, in which the frequency of the driving magnetic field is shifted in relation to the resonance frequency of the coupling means, preferably by at the most approximately 10%. This operating state of the drive device can be used to bring the retaining part from the release position into the retaining position. Since, in this operating state, the momentum transferred to the coupling means and thus to the retaining part is smaller than the maximum transferable momentum, it is ensured that a connection established by means of the drive device can be released again with certainty by the same drive device.

In another embodiment, an assembly set is provided for establishing a releasable connection between a first component and a second component which comprises an inventive connecting means and an inventive drive device.

A further object underlying the present invention is to provide a method for releasing a connection between two components of the type described at the outset, by means of which the components can be released from one another without the relevant components needing to be weakened unnecessarily by channels.

This object is accomplished in accordance with an illustrated embodiment of the invention, in a method wherein the retaining part is moved from the retaining position into the release position by means of a driving magnetic field variable with time and acting on the connecting means from outside the connecting means.

The inventive method offers the advantage that no additional channels need be provided in the relevant components in order to facilitate a direct mechanical engagement of a tool in the connecting means for releasing the connection between the components. In addition, it is possible to arrange the connecting means invisibly on the components connected to one another in the connected state.

Additional features and advantages of the invention are the subject matter of the following description and the drawings illustrating embodiments.

In the drawings:

FIG. 4 shows a schematic longitudinal section similar to FIG. 1, wherein, in addition, the position of a control device for releasing and establishing the connection between the two components is illustrated relative to the connecting means;

FIG. 5 shows a schematic longitudinal section through a drive device for releasing and establishing a connection between two components established by means of an inventive connecting means;

Figure 8:
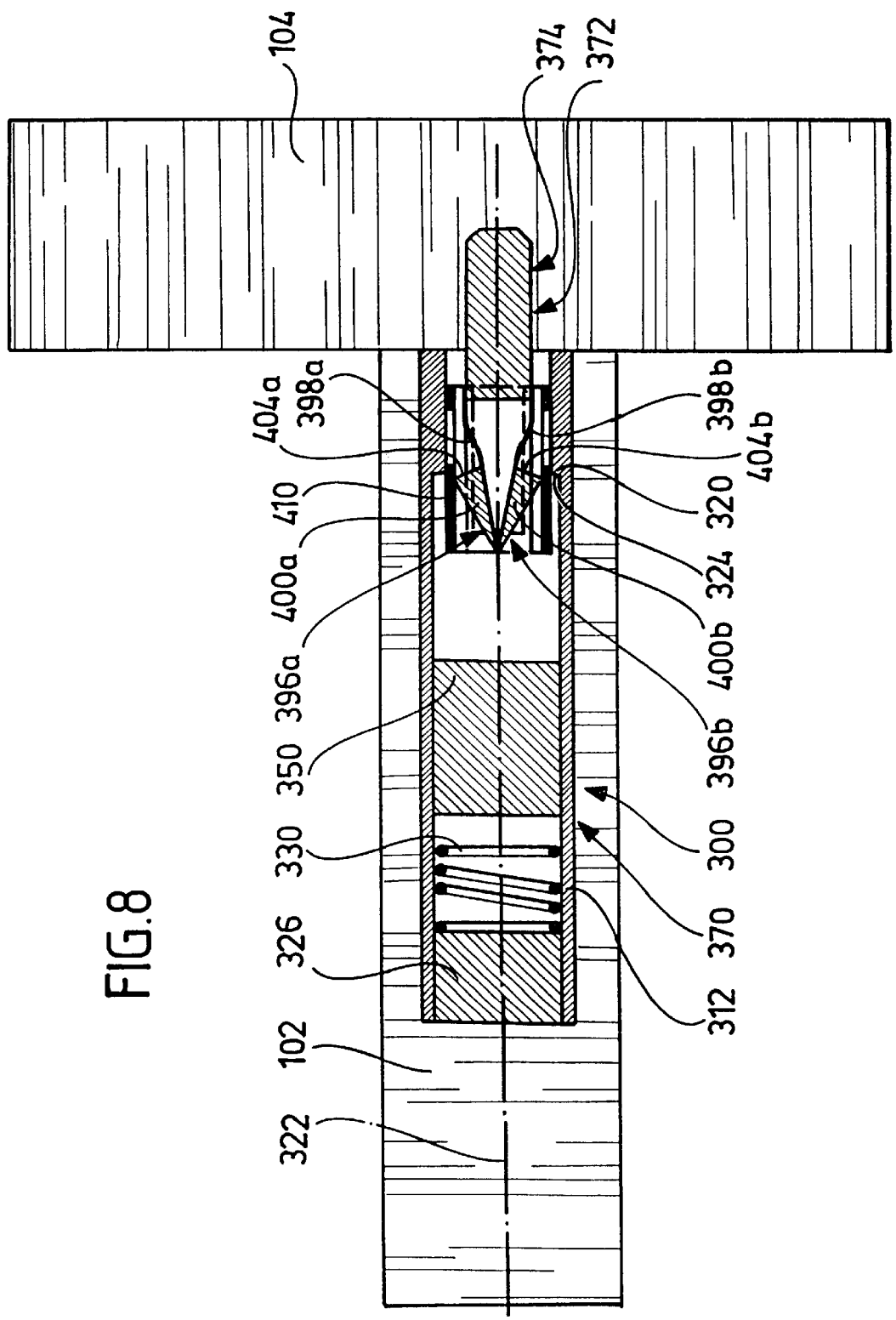
Figure 9:
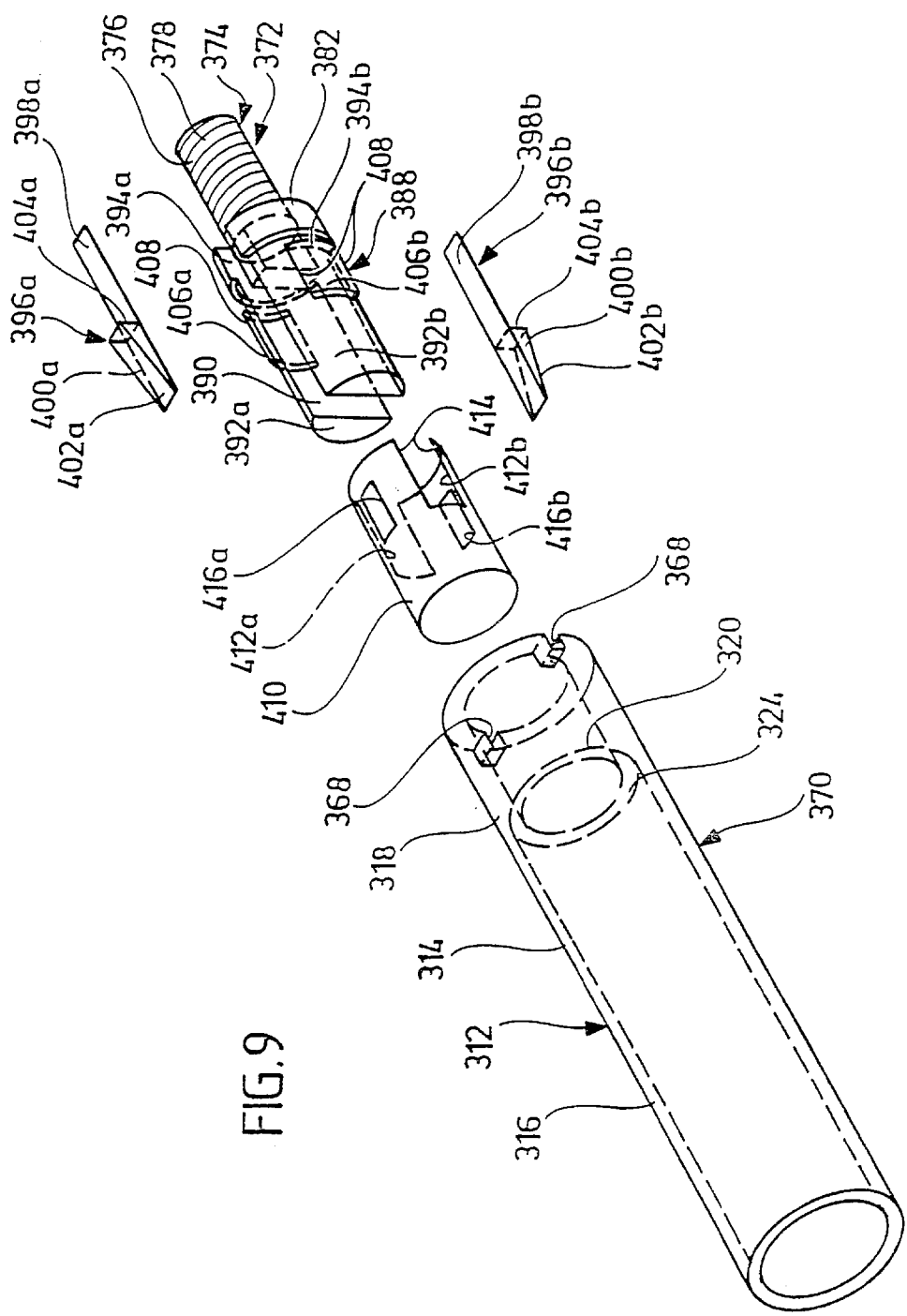
Figure 10:
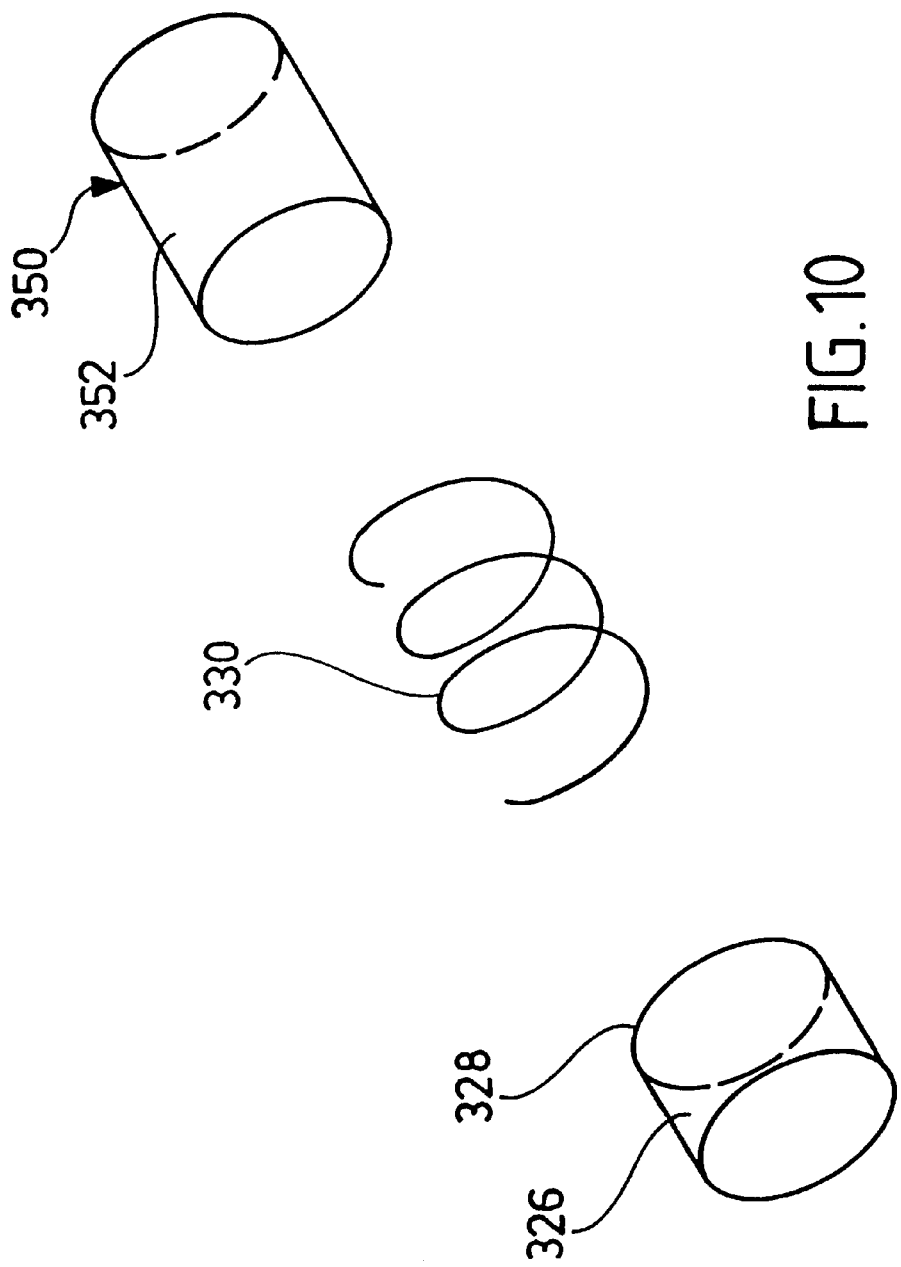
Figure 11:
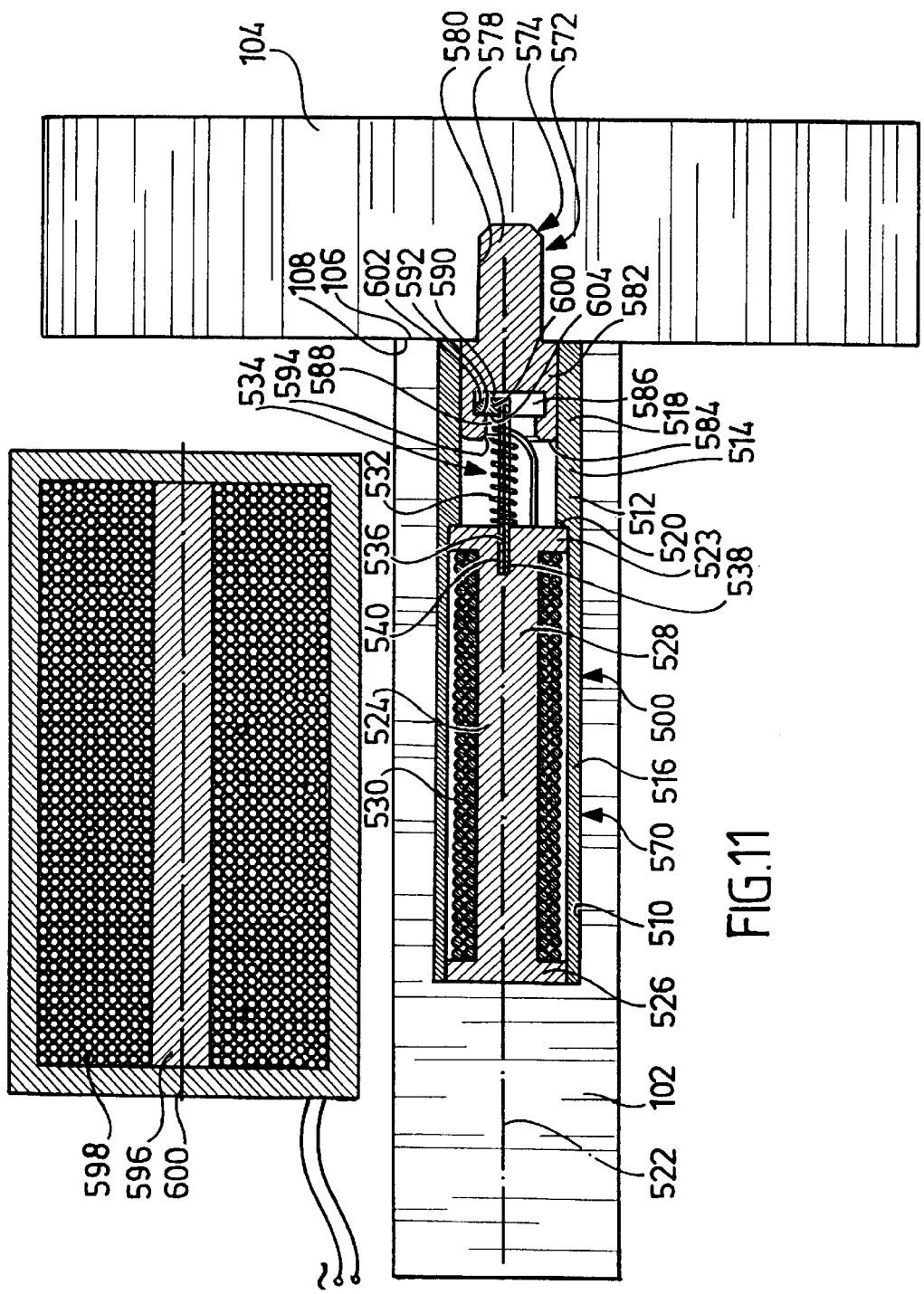
Figure 12:
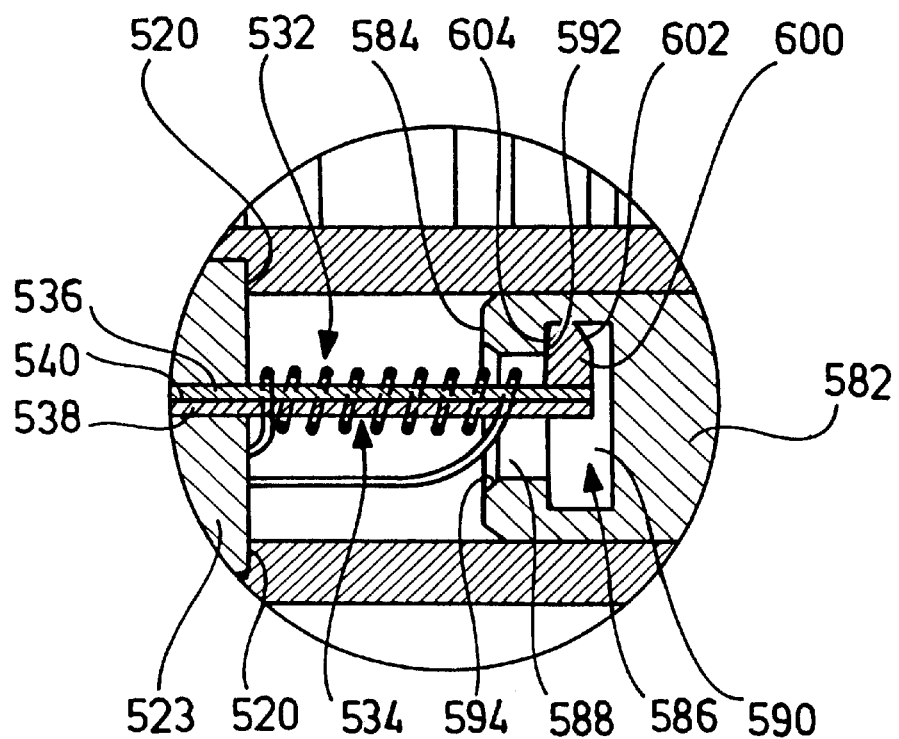

FIG. 7 shows a schematic longitudinal section through two components which are releasably connected to one another by means of a second embodiment of the inventive connecting means, wherein the position of a drive device for establishing and releasing the connection between the components is illustrated relative to the connecting means and a retaining part of the connecting means is in its retaining position;

FIG. 8 shows an illustration similar to FIG. 7, wherein the retaining part of the connecting means is in its release position;

FIG. 9 shows an exploded illustration of an outer sleeve of a first connecting element and a second connecting element of the connecting means from FIGS. 7 and 8;

FIG. 10 shows an exploded illustration of a coupling means of the first connecting element from FIG. 9;

FIG. 11 shows a schematic longitudinal section through two components which are releasably connected to one another by means of a third embodiment of the inventive connecting means, wherein the position of a drive device for releasing the connection between the components is illustrated relative to the connecting means, and FIG. 12 shows an enlarged illustration of the area I from FIG. 11.

In all the Figures, the same or functionally equivalent elements are designated with the same reference numerals.

A first embodiment of a connecting means designated as a whole as 100 and illustrated in FIGS. 1 to 4 will be explained in the following with the example of a connection of a first, essentially board-like component 102 with a second, likewise essentially board-like component 104 (cf. FIG. 1).

The two components 102 and 104 consist, for example, of wood or plywood but can also consist of any other optional materials, for example, of a (non-ferromagnetic) metal or a plastic material. Furthermore, it may be provided for the first component 102 and the second component 104 to consist of materials differing from one another.

Figure 1:
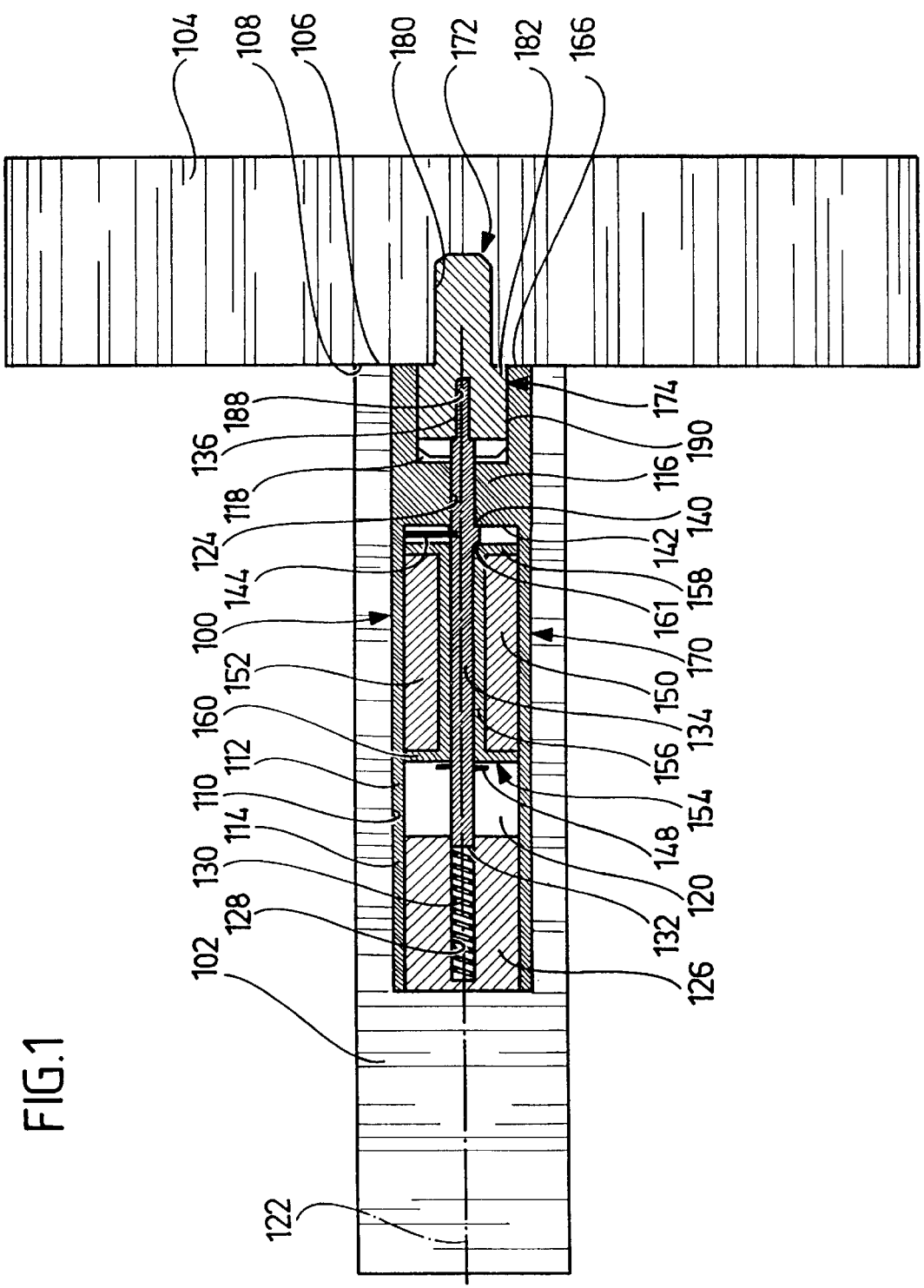
FIG. 1 shows a schematic longitudinal section through two components releasably connected to one another by means of a first embodiment of the inventive connecting means.

In the connected state of the two components 102 and 104 illustrated in FIG. 1, a contact surface 106 of the first component 102 which forms a narrow side of the first component 102 abuts on a main surface 108 of the board-like second component 104.

A cylindrical bore 110 extending into the interior of the first component 102 opens onto the contact surface 106 and a hollow cylindrical outer sleeve 112 is screwed into this bore by means of an external thread (not illustrated for reasons of clarity).

The outer sleeve 112 could also be secured in position in the cylindrical bore 110 of the first component 102 in a different way, for example, by way of a pressure fit.

Figure 2:
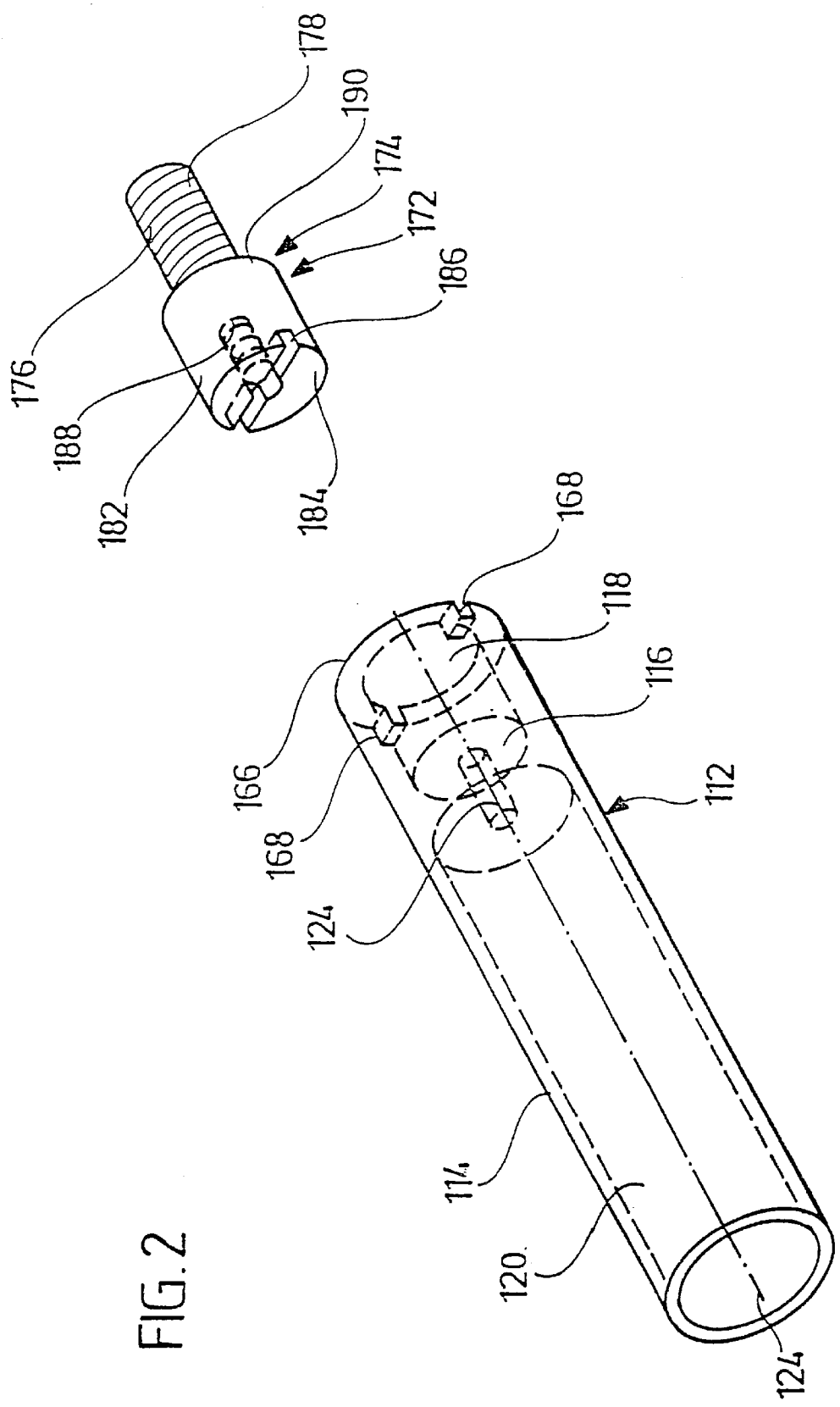
FIG. 2 shows a perspective illustration of an outer sleeve of a first connecting element and a second connecting element of the connecting means from FIG. 1.

As is apparent from FIGS. 1 and 2, the hollow cylindrical outer sleeve 112 has in its front half, i.e. facing the contact surface 106 in the assembled state, an annular shoulder 116 which projects inwards from the casing wall 114 of the outer sleeve 112 and subdivides the interior space of the outer sleeve 112 into a receiving chamber 118 arranged in front of the shoulder 116 and a coupling chamber 120 arranged behind the shoulder 116.

The receiving chamber 118 and the coupling chamber 120 are connected to one another by a cylindrical guide channel 124 extending along the axis 122 of the outer sleeve 112.

The end of the coupling chamber 120 facing away from the receiving chamber 118 is closed by means of a cylindrical closure plug 126 (cf. FIG. 3) which is arranged in the outer sleeve 112 in a pressure fit.

A cylindrical blind-end bore 128 aligned coaxially to the outer sleeve 112 opens on the front side of the closure plug 126 facing the receiving chamber 118 and a pressure helical spring 130, which is supported with one end on the base of the blind-end bore 128, is accommodated in this blind-end bore.

The other end of the pressure helical spring 130 likewise arranged within the blind-end bore 128 abuts on a rear end face 132 of a cylindrical shaft 134 which is aligned coaxially to the outer sleeve 112 and engages through the guide channel 124 so that the shaft 134 is mounted for rotation in the guide channel 124 and in the blind-end bore 128 and for displacement in axial direction.

The front end of the shaft 134 dipping into the receiving chamber 118 is provided with an external thread 136.

An annular collar 138 (cf. FIG. 3) is formed on the shaft 134 between the external thread 136 and the rear end face 132 and its front side 140 is pressed by the force of the pressure helical spring 130 against the rear side 142 of the shoulder 116 and thus serves as a front stop for the axial displacement of the shaft 134 (cf. FIG. 1).

An entraining pin 144, which projects outwards in a radial direction and is non-rotatably connected to the shaft 134, is integrally formed on the collar 138.

Between the collar 138 and the rear end face 132 of the shaft 134 this is provided along its circumference with an annular groove 146, into which a slit washer 148 is inserted.

As is best seen from FIG. 1, an essentially cylindrical magnetic element 150 is rotatably arranged on the shaft 134 between the collar 138 and the slit washer 148.

The magnetic element 150 comprises a hollow cylindrical magnetic member 152 which consists of a permanent magnet material magnetized essentially at right angles to its longitudinal axis (so-called diametric magnetization).

For the rotatable mounting of the magnetic member 152 on the shaft 134, a plastic sheathing 154 is sprayed onto it and this sheathing comprises a hollow cylindrical bushing 156 arranged in the interior of the magnetic member 152 as well as a front end cap 158 arranged on the front end face of the magnetic member 152, i.e. facing the collar 138, and a rear end cap 160 arranged on the rear end face of the magnetic member 152, i.e. facing the slit washer 148.

In this respect, the inner wall of the bushing 156 abuts on the shaft 134 whereas the front end cap 158 abuts on a rear side 161 of the collar 138 and the rear end cap 160 abuts on a front side of the slit washer 148 so that the magnetic element 150 is fixed in its axial position relative to the shaft 134 by the collar 138 and the slit washer 148.

As a result of the fact that the magnetic element 150 is rotatably mounted on the shaft 134 and not, for example, on the inner wall of the outer sleeve 112, the torque required to overcome the bearing friction is reduced since the frictional forces occurring at the circumferential surface of the shaft 134 act on the magnetic element 150 with only a small lever arm.

Figure 3:
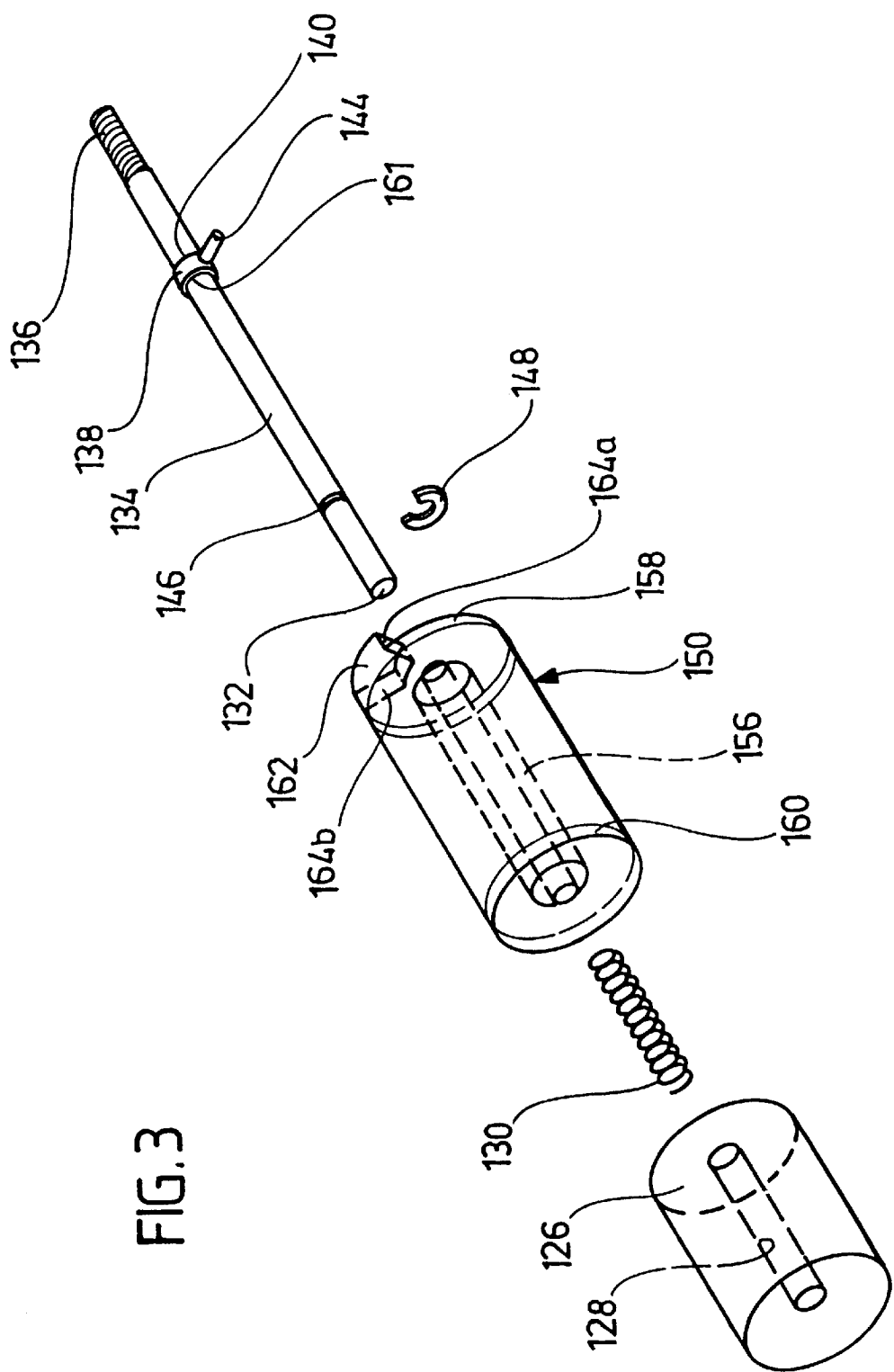
FIG. 3 shows an exploded illustrated of a retaining part and a coupling means which are arranged in the outer sleeve of the first connecting element from FIG. 2.

An entraining projection 162, which is designed in one piece with the front end cap 158, has a cross section essentially in the shape of a sector of a circle and extends along the circumference of the front end cap 158 over an angle of, for example, up to 60°, preferably up to 30°, projects forwards from the front side of the front end cap 158 (cf. FIG. 3).

Radially aligned, lateral boundary surfaces of the entraining projection 162 form entraining surfaces 164a and 164b which, in a suitable angular position of the magnetic element 150 relative to the shaft 134, interact with the entraining pin 144 of the shaft 134 such that the entraining pin 144 and thus the shaft 134 are taken along in the direction of rotation of the magnetic element 150 by the same. As a result of the entraining surfaces 164a, 164b and the entraining pin 144, transfer of a rotary movement of the magnetic element 150 to the shaft 134 is thus possible.

The front end face 166 of the outer sleeve 112, i.e. that located in the contact surface 106 of the first component 102 in the assembled state, is provided with a slot 168 which extends in radial direction and in which a suitable tool, for example, a screw driver can engage to turn the outer sleeve 112 into the cylindrical bore 110 of the first component 102.

The outer sleeve 112 forms together with the elements arranged therein, namely the closure plug 126, the pressure helical spring 130, the shaft 134, the slit washer 148 and the magnetic element 150, a first connecting element 170 of the connecting means 100.

A second connecting element 172 of the connecting means 100 is formed by a stay bolt 174 (cf. FIGS. 1 and 2) which comprises a cylindrical shaft 178 which is provided with an external thread 176 and with which the stay bolt 174 is turned into a cylindrical bore 180 opening on the main surface 108 of the second component 104 in the assembled state.

Furthermore, the stay bolt 174 comprises a cylindrical bolt head 182 which rests on the main surface 108 of the second component 104 in the assembled state, is aligned coaxially to the shaft 178 and the diameter of which exceeds the diameter of the shaft 178.

The front end face 184 of the bolt head 182 facing away from the shaft 178 is also, like the front end face 166 of the outer sleeve 112, provided with a continuous slot 186 which extends in a radial direction and into which a suitable tool, for example, a screw driver can engage in order to turn the stay bolt 174 into the cylindrical bore 180 of the second component 104.

Furthermore, the bolt head 182 is provided with a centrally arranged, threaded blind-end bore 188 opening on the front end face 184.

In the assembled state of the two components 102 and 104, which is illustrated in FIG. 1, the shaft 134 of the first connecting element 170 is screwed with its external thread 136 into the internal thread of the threaded blind-end bore 188 of the stay bolt 174 serving as second connecting element 172. This screw connection bears the traction forces of the connection acting in the direction of connection, i.e., in the direction of the axis 122.

As is apparent from FIG. 1, the bolt head 182 of the stay bolt 174 dips completely into the receiving chamber 118 of the outer sleeve 112 in the assembled state, wherein the casing surface 190 of the bolt head 182 abuts areally on the inner wall of the outer sleeve 112. The shearing forces of the connection are transferred as a result of this areal contact between the bolt head 182 and the outer sleeve 112.

As a result of the fact that the bolt head 182 has a smaller axial extension than the receiving chamber 118 it is ensured that the bolt head 182 can dip completely into the receiving chamber 118. As a result, the connecting means 100 formed from the connecting elements 170 and 172 is completely invisible in the connected state of the two components 102 and 104 which considerably improves the optical impression of the product assembled from the components 102 and 104, for example, a piece of furniture.

Very large shearing forces can be absorbed due to the areal fit between the bolt head 182 and the outer sleeve 112.

Since the shaft 178 anchoring the stay bolt 174 in the second component 104 has a greater axial extension than the bolt head 182 projecting beyond the second component 104, the cylindrical bore 180, in which the stay bolt 174 is secured, is thereby prevented from breaking out.

To establish a releasable connection between the components 102 and 104 by means of the connecting means 100 described in the above, the following procedure is followed:

First of all, the cylindrical bore 110 is produced in the first component 102 by means of a drill and the first connecting element 170, i.e., the outer sleeve 112 with the elements arranged in it and described above is turned into the cylindrical bore 110 by means of a tool, for example, a screw driver engaging in the slot 168 in the front end face 166 of the outer sleeve 112 such that the front end face 166 of the outer sleeve 112 is flush with the contact surface 106.

The outer sleeve 112 can also be turned further into the cylindrical bore 110 so that its front end face 166 is located somewhat behind the contact surface 106.

The cylindrical bore 180 is produced in the second component 104 by means of a suitable drill, and the stay bolt 174 serving as second connecting element 172 is turned into the cylindrical bore 180 by means of a tool, for example, a screw driver engaging in the slot 186 in the bolt head 182 to such an extent that the bolt head 182 is seated on the main surface 108 of the second component 104.

The two components 102 and 104 are then brought together such that the bolt head 182 dips completely into the receiving chamber 118 of the outer sleeve 112 and the contact surface 106 of the first component 102 abuts on the main surface 108 of the second component 104.

In this respect, the outermost turn of the internal thread of the threaded blind-end bore 188 in the bolt head 182 presses against the outermost turn of the external thread 136 of the shaft 134 so that the shaft 134 is displaced rearwards (to the left in the illustration of FIG. 1) along the axis 122 contrary to the resistance of the pressure helical spring 130. Any damage to the external thread 136 of the shaft 134 is avoided due to the spring mounting of the shaft 134 in the blind-end bore 128.

To establish the releasable connection, the front end of the shaft 134 must now be screwed into the threaded blind-end bore 188 of the stay bolt 174.

This screwing-in process is brought about by means of a drive device illustrated in FIG. 5 and designated as a whole as 192, the construction of which will be explained in the following.

The drive device 192 comprises a housing 194, for example, consisting of plastic with a driving chamber 196 and a handle 197 shaped for favorable gripping and connected to the driving chamber 196.

An electric motor 198 is arranged in the driving chamber 196 of the housing 194 and its drive shaft 200 is non-rotatably connected by means of a coupling element 202 to a shaft 204, on which a driving magnet 206 rotating with the shaft 204 is arranged.

The driving magnet 206 is designed as a cylindrical, high-power permanent magnet magnetized essentially at right angles to the longitudinal direction of the shaft 204 (so-called diametric magnetization).

The electric motor 198 can be switched off by means of a three-stage selector switch 208 arranged on the handle 197 or selectively into one of two possible operating states, of which a first operating state serves to establish a releasable connection and the second operation state to release a releasable connection. These two operating states differ from one another due to the direction of rotation of the electric motor 198 as well as due to its rotational speed, as will be explained in greater detail in the following.

The electric energy required to drive the electric motor 198 is taken from a battery accommodated, for example, in the handle 197.

Supplementary or alternatively to this it is also possible to provide the drive device 192 with a mains connection and obtain the required electric energy from an electric supply mains.

With the aid of the drive device 192 described above the shaft 134 is screwed into the bolt head 182 as follows:

The drive device 192 is brought into a position relative to the connecting means 100, in which the shaft 204 of the driving magnet 206 and the shaft 134 of the first connecting element 170 are aligned parallel to one another and the distance between the driving magnet 206 and the magnetic element 150 is as small as possible in order to obtain as strong an interaction of the magnets with one another as possible. The position of the electric motor 198 and of the driving magnet 206 in this position are illustrated schematically in FIG. 4. The housing 194 of the drive device 192 is omitted in this illustration for reasons of clarity.

If the first operating state (establishing the connection) is now selected by actuating the selector switch 208, the drive shaft 200 and with it the driving magnet 206 are turned in the clockwise direction (when looking along the viewing direction indicated in FIG. 4 by the arrow 210). On account of the diametric magnetization of the driving magnet 206 the north pole (N) and the south pole (S) of the driving magnet rotate in the clockwise direction, as is apparent in the schematic illustration of FIG. 6A.

The rotary movement of the driving magnet 206 thus generates a rotating driving magnetic field.

So that this driving magnetic field can penetrate the interior of the outer sleeve 112 and interact with the magnetic element 150, the outer sleeve 112 consists of a non-ferromagnetic material, for example, of brass.

Since unlike poles of the magnetic element 150 and of the driving magnet 206 attract and like poles of these elements repulse one another, the magnetic element 150 turns in the outer sleeve 112 with an opposite direction of rotation, i.e. in the counterclockwise direction (when viewed in the direction of viewing 210) on account of the interaction with the driving magnet 206.

Figure 6A:
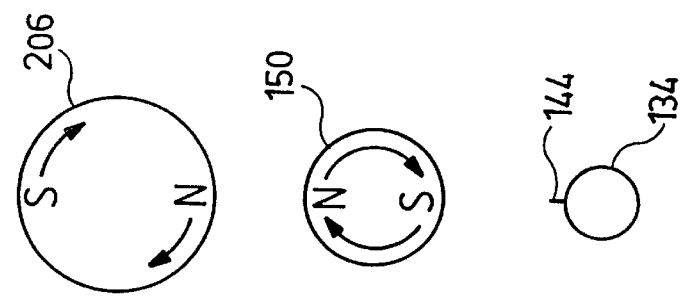
FIGS. 6A–6H show a sequence of schematic illustrations of the positions of a driving magnet of the drive device from FIG. 5, a magnetic element of the coupling means from FIG. 3 and the retaining part from FIG. 3 during the establishment of a connection between two components by means of the connecting means from FIG. 1.
Figure 6B:
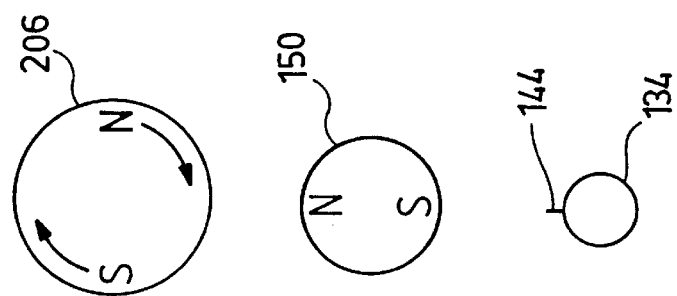

In this respect, the entraining surface 164a of the entraining projection 162 of the magnetic element 150 is in engagement with the entraining pin 144 of the shaft 134 so that the shaft 134 is driven by the magnetic element 150 to perform a rotary movement about the axis 122 with the same direction of rotation as the magnetic element 150 (cf. FIGS. 6A and 6B).

Since the external thread 126 of the shaft 134 is a right-hand thread and the shaft 134 is tensioned towards the bolt head 182 by the pressure helical spring 130, the shaft 134 is screwed into the threaded blind-end bore 188 of the bolt head 182 due to this rotary movement.

Figure 6C:
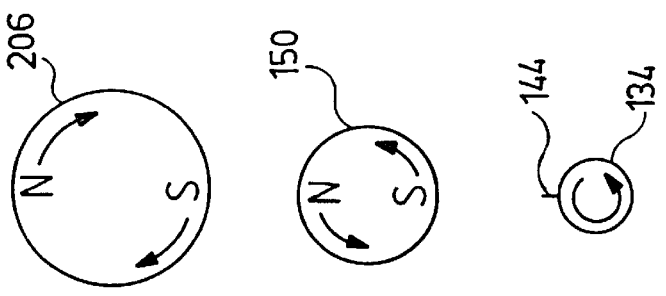

The magnetic element 150 and the shaft 134 taken along by it follow the rotary movement of the driving magnet 206 for such a time until the resistance acting on the shaft 134 is so large that the torque which is transferred from the rotating magnetic field generated by the driving magnet 206 is no longer sufficient to turn the shaft 134 further. If such a blocking point is reached, the shaft 134 and the magnetic element 150 remain in the position reached while the driving magnet 206 turns further (cf. FIG. 6C).

Figure 6D:
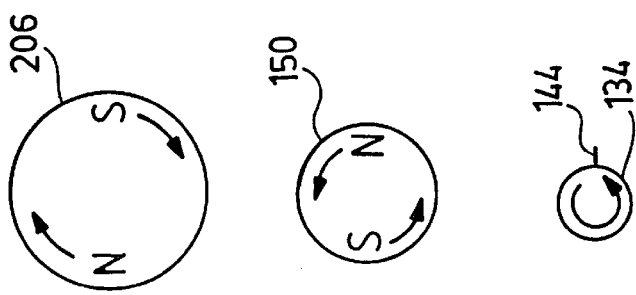
Figure 6H:
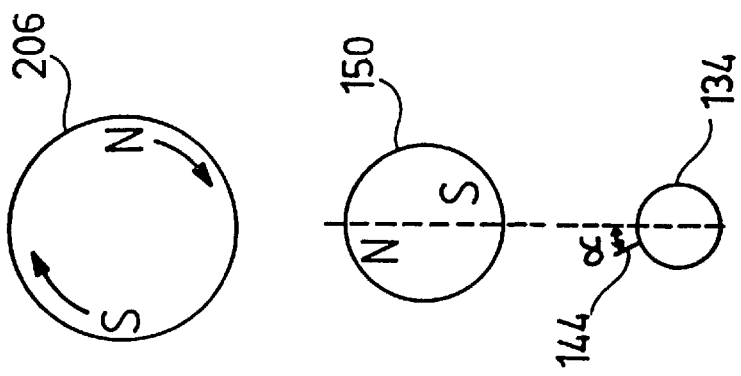
Figure 6G:
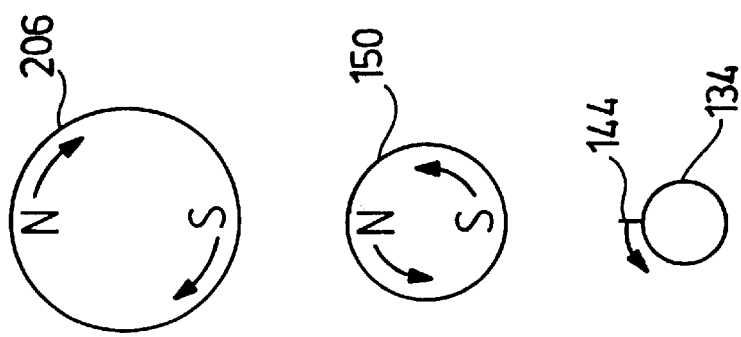
Figure 6F:
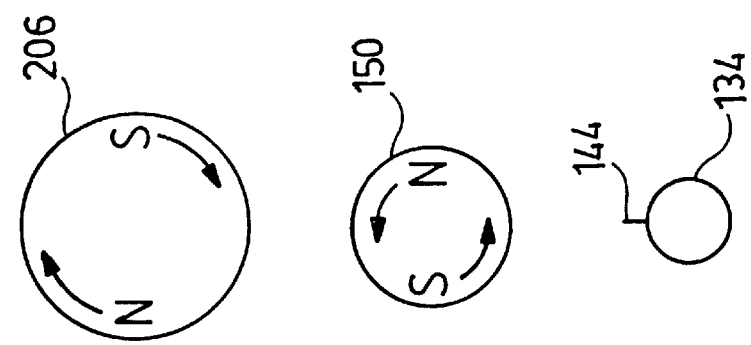
Figure 6E:
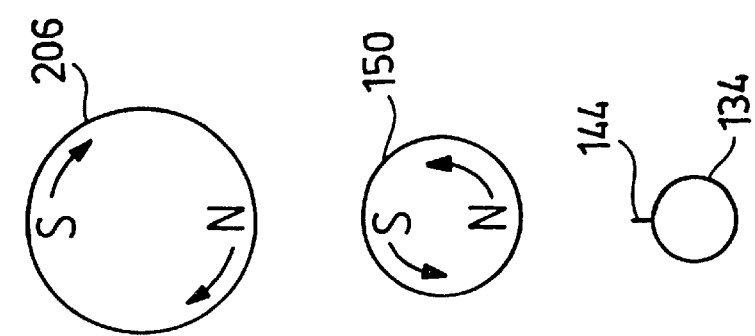

Only when the driving magnet 206 has turned further through approximately 180° so that like poles of the driving magnet 206 and of the magnetic element 150 are located directly opposite one another (cf. FIG. 6D) will the magnetic element 150 start to move again, namely in a direction of rotation the same as the direction of rotation of the driving magnet 206, until unlike poles of the driving magnet 206 and of the magnetic element 150 are again located opposite one another (cf. FIG. 6E).

If this state is reached, the direction of rotation of the magnetic element 150 again reverses and the magnetic element 150 again turns in the opposite direction to the driving magnet 206, as in the phase prior to the blocking of the shaft 134 occurring (cf. FIG. 6F).

Since, as a result of the reversal procedure which occurs very quickly (cf. FIG. 6D), the angular distance between the entraining pin 144 and the entraining surface 164a has increased to approximately 180°, the magnetic element 150 is accelerated by the rotating magnetic field of the driving magnet 206 over approximately half a rotation until the entraining surface 164a again strikes the entraining pin 144 and the momentum of the magnetic element 150 is suddenly transferred to the entraining pin 144 and thus to the shaft 134. As a result of this large transfer of momentum, the shaft 134 can be released from its blocked position (cf. FIG. 6G) and turn further through a certain angle α into a position, in which a renewed blocking of the shaft 134 occurs (cf. FIG. 6H). The magnetic element 150 also remains in this new blocked position again without being able to continue to follow the driving magnet 206 until like poles of the magnetic element 150 and of the driving magnet 206 are again located opposite one another, as already shown in FIG. 6D, and a renewed reversal procedure of the magnetic element 150 makes a renewed take up of momentum possible.

The shaft 134 is driven further into the internal thread of the threaded blind-end bore 188 from blocked position to blocked position in the manner described in the above and repeated periodically until an adequately secure screw connection between the shaft 134 and the bolt head 182 is established and the electric motor 198 can be switched off by actuating the selector switch 208.

The repeated gathering of momentum and abutting of the entraining projection 162 on the entraining pin 144 generates a sledge hammer effect which greatly accelerates the turning of the shaft 134 into the threaded blind-end bore 188.

The size of the momentum transferable to the magnetic element 150 during each rotation of the driving magnet 206 is dependent to a considerable extent on the rotational frequency of the driving magnet 206.

If this rotational frequency is low, the angular velocity of the magnetic element 150 can also not be too great which limits the maximum rotary momentum of the magnetic element 150 which can be reached.

If, on the other hand, the rotational frequency of the driving magnet 206 is to o high, the entraining surface 164a reaches only a small angular distance from the entraining pin 144 during the reversal procedure described above and so only a slight rotary angle is available for the renewed acceleration of the magnetic element 150.

It is clear from the aforesaid that there is a certain frequency between the too low and the too high rotational frequencies of the driving magnet 206, at which the rotary momentum transferable to the magnetic element 150 per rotation of the driving magnet 206 is at a maximum. This frequency depends on the construction of the magnetic element 150, in particular, its moment of inertia and is designated in the following as resonance frequency.

To establish the releasable connection between the components 102 and 104, the rotational frequency of the electric motor 198 and thus of the driving magnet 206 is preferably selected so as to differ from the resonance frequency, for example, be 5% to 10% greater or smaller than the resonance frequency. As a result, it is ensured that the starting torque of the shaft 134 is smaller than the maximum torque transferable by means of the drive device 192.

If the shaft 134 is screwed into the threaded blind-end bore 188, it prevents any relative movement of the first connecting element 170 and the second connecting element 172 along the axis 122. The shaft 134 thus serves as a retaining part of the connecting means 100.

As described above, the shaft 134 can be moved into its retaining position as a result of the interaction of the magnetic element 150 with the rotating driving magnetic field generated by the driving magnet 206. The magnetic element 150 thus represents a coupling means of the connecting means 100.

To release the connection between the components 102 and 104, the drive device 192 is likewise positioned relative to the connecting means 100 in the manner described above and illustrated in FIG. 4.

Subsequently, the electric motor 198 is switched by actuation of the selector switch 208 into the second operating state (release of the connection), in which the drive shaft 200 and with it the driving magnet 206 turn in the counter-clockwise direction (when seen in the direction of viewing 210).

As a result, a rotating driving magnetic field is generated which generates a torque acting on the shaft 134 in a corresponding manner, as described above with reference to FIGS. 6A to 6H. The only difference to the procedure for establishing the connection is to be seen in the fact that all the directions of rotation of the relevant elements are reversed and during the release of the connection instead of the entraining surface 164a the additional entraining surface 164b of the entraining projection 162 comes into contact with the entraining pin 144 of the shaft 134.

In this way, the shaft 134 is turned out of the internal thread of the threaded blind-end bore 188 from blocking point to blocking point until the resistance acting on the shaft 134 is so slight that the shaft 134 can rotate freely with the magnetic element 150 and the magnetic element 150 can follow the rotary movement of the driving magnet 206 free from blockage.

The release position of the shaft 134 acting as retaining part is thus reached, the external thread 136 of the shaft 134 and the internal thread of the threaded blind-end bore 188 no longer engage with one another, and the first component 102 and the second component 104 can be moved apart.

In the second operating state of the drive device 192 used for releasing the connection, the rotational frequency of the drive shaft 200 and thus of the driving magnet 206 corresponds as exactly as possible to the resonance frequency defined in the above so that the torque transferable to the shaft 134 reaches its maximum value and is certainly greater than the starting torque used during establishment of the connection.

A second embodiment of an inventive connecting means designated as a whole as 300 will be explained in the following with reference to FIGS. 7 to 10.

As is apparent from FIG. 7, the second embodiment 300 is also formed by a first connecting element 370 and a second connecting element 372, wherein the first connecting element 370 comprises a hollow cylindrical outer sleeve 312 which is turned into a cylindrical bore 310, which opens on the contact surface 106 of the first component 102, by means of an external thread (not illustrated for reasons of clarity).

The casing wall 314 of the outer sleeve 312 has a thinner rear section 316, i.e. facing away from the contact surface 106 in the assembled state, and a thicker front section 318, i.e. facing the contact surface 106, wherein the rear section 316 merges into the front section 318 at a step 320 formed on the inner side of the outer sleeve 312.

A rear side of the step 320 facing away from the contact surface 106 in the assembled state forms an annular locking surface 324 of the outer sleeve 312 which is directed towards the axis 322 of the outer sleeve 312 at an angle of, for example, 75°.

A rear end of the outer sleeve 312, i.e. facing away from the contact surface 106 in the assembled state, is closed by means of a cylindrical closure plug 326 which is secured in the outer sleeve 312 by means of a pressure fit.

One end of a pressure helical spring 330 is secured on a front side 328 of the closure plug facing the contact surface 106 in the assembled state, the other end of the spring faces way from the closure plug 326 and is displaceable along the axis 322 of the outer sleeve 312.

A cylindrical magnetic element 350, which is aligned coaxially to the outer sleeve 312 and guided on the rear section 316 of the casing wall 314 of the outer sleeve 312 so as to be slidingly displaceable, is arranged between the free end of the pressure helical spring 330 and the step 320.

The magnetic element 350 comprises a magnetic member 352 consisting of a permanent magnet material magnetized parallel to the axis of the magnetic element 350 and thus to the axis 322 of the outer sleeve 312 (parallel magnetization).

The front and the rear end faces of the magnetic element 350 may each be provided with protective caps consisting of a plastic material sprayed onto the magnetic member 352.

The second connecting element 372 of the connecting means 300, which interacts with the first connecting element 370 to establish the connection between the components 102 and 104, comprises a stay bolt 374, the shaft 378 of which provided with an external thread 376 is turned into a cylindrical bore 380 opening on the main surface 108 of the second component 104.

Furthermore, the stay bolt 374 comprises an essentially cylindrical bolt head 382 (cf. FIG. 9), the rear side of which facing the shaft 378 abuts on the main surface 108 of the second component 104 in the assembled state.

A cylindrical guide pin 388, which is aligned coaxially to the bolt head 382 and subdivided into two guide pin halves 392a and 392b by a receiving slot 390 continuous in a radial direction and in a longitudinal direction of the guide pin 388, projects from the front side of the bolt head 382 facing away from the shaft 378.

Two recesses 394a and 394b in the bolt head 382, which extend in a radial direction of the bolt head 382 from points on the circumference of the bolt head 382 located opposite one another, are aligned with the receiving slot 390 in the guide pin 388.

A locking element 396a, 396b is secured on the base surface of each of the recesses 394a, 394b located inwards in a radial direction and comprises a leaf spring element 398a, 398b which extends into the receiving slot 390 from the base of the respective recess 394a, 394b parallel to the longitudinal axis of the guide pin 388 and supports a wedge-shaped locking tongue 400a and 400b, respectively, at its free end facing away from the bolt head 382.

Each of the locking tongues 400a, 400b has a wedge surface 402a, 402b which faces away from the bolt head 382 and forms an acute angle of, for example, 15° with the outer side of the respectively associated leaf spring element 398a and 398b.

Furthermore, each of the locking tongues 400a, 400b has a locking surface 404a, 404b which faces the bolt head 382 and forms with the outer side of the respectively associated leaf spring element 398a and 398b an angle which corresponds essentially to the angle which the locking surface 324 of the step 320 of the outer sleeve 312 forms with the axis 322 of the outer sleeve 312.

Each of the guide pin halves 392a, 392b is provided with a respective guide projection 406a and 406b which projects outwards in a radial direction from the outer surface of the respectively associated guide pin half 392a, 392b and extends along the circumference of the respective guide pin half 392a, 392b over an angle of, for example, approximately 60°.

Lateral boundary surfaces of the guide projections 406a and 406b extending parallel to the longitudinal axis of the guide pin 388 form guide surfaces 408 for the axial guidance of a hollow cylindrical unlocking sleeve 410, which is pushed onto the guide pin 388 and is provided at its end facing the bolt head 382 with guide recesses 412a, 412b which extend in an axial direction and the axially extending, lateral boundary surfaces of which form guide surfaces 414 which interact with the guide surfaces 408 of the guide projections 406a, 406b for the axial guidance of the unlocking sleeve 410 on the guide pin 388.

Furthermore, the unlocking sleeve 410 is provided with openings which are arranged in circumferential direction between the guide recesses 412a and 412b, are designated in the following as windows 416a and 416b and aligned with the receiving slot 390 of the guide pin 388 when the unlocking sleeve 410 is guided with the guide surfaces 414 on the guide surfaces 408 of the guide pin 388.

To establish a releasable connection between the two components 102 and 104 by means of the connecting means 300, the procedure is as follows:

First of all, the cylindrical bore 310 is produced in the first component 102 by means of a suitable drill, and the outer sleeve 312 is turned into the cylindrical bore 310 by means of a suitable tool, for example, a screw driver until its front end is flush with the contact surface 106.

To make possible or facilitate the turning into the cylindrical bore 310, the outer sleeve 312 is provided at its front end face with a radially extending slot 368, into which the tool, for example, the screw driver can engage.

Furthermore, the cylindrical bore 380 is produced in the second component 104 by means of a suitable drill, and the shaft 378 of the stay bolt 374 is turned into the cylindrical bore 380 by means of a suitable tool, for example, a screw driver until the bolt head 382 abuts on the main surface 108 of the second component 104.

The tool used to turn the stay bolt 374 into the cylindrical bore 380 can engage in the receiving slot 390 of the guide pin 388.

Subsequently, the unlocking sleeve 410 is pushed onto the guide pin 388 from the front side thereof such that its guide surfaces 414 engage with the guide surfaces 408 of the guide pin 388.

While the unlocking sleeve 410 is being pushed onto the guide pin 388 the locking tongues 400a, 400b of the locking elements 396a and 396b, respectively, are first pressed radially inwards into the receiving slot 390 by the area of the unlocking sleeve 410 facing the bolt head 382 until the windows 416a, 416b of the unlocking sleeve 410 reach the axial position of the locking tongues 400a and 400b, whereby the locking tongues 400a, 400b can move radially outwards into the position illustrated in FIG. 7, in which the locking tongues 400a, 400b engage with the windows 416a, 416b of the unlocking sleeve 410. In this position an additional displacement of the unlocking sleeve 410 onto the guide pin 388 is possible only contrary to the resistance of the leaf spring elements 398a, 398b.

To establish the releasable connection between the components 102 and 104, the components 102 and 104 are subsequently moved towards one another such that the stay bolt 374 dips into the interior of the outer sleeve 312 with the guide pin 388 and the unlocking sleeve 410 pushed onto it. While these elements are being inserted into the outer sleeve 312, the locking tongues 400a, 400b are first pressed radially inwards into the receiving slot 390 by the front section 318 of the casing wall 314 of the outer sleeve 312, the inner diameter of which corresponds essentially to the outer diameter of the unlocking sleeve 410, until the end position illustrated in FIG. 7 is reached, in which the contact surface 106 of the first component 102 abuts on the main surface 108 of the second component 104 and the windows 416a, 416b in the unlocking sleeve 410 are located opposite the thinner, rear section 316 of the casing wall 314 of the outer sleeve 312 so that the locking tongues 400a and 400b can again move radially outwards through the windows 416a and 416b, respectively, whereby the locking surfaces 404a and 404b of the locking elements 396a and 396b, respectively, engage with the locking surface 324 of the step 320 of the outer sleeve 312. As a result, the first connecting element 370 comprising the outer sleeve 312 is locked with the second connecting element 372 comprising the stay bolt 374 such that any relative movement of these connecting elements along the axis 322 of the outer sleeve 312 is prevented.

In this connected position of the components 102 and 104, the circumferential surface of the bolt head 382, the diameter of which corresponds essentially to the outer diameter of the unlocking sleeve 410, abuts areally on the front section 318 of the casing wall 314 of the outer sleeve 312 which facilitates the transfer of considerable shearing forces between the first connecting element 370 and the second connecting element 372.

The traction forces occurring in the connection of the two components 102 and 104 along the direction of connection (axis 322) are transferred due to the locking of the locking tongues 400a and 400b with the step 320 of the outer sleeve 312.

To release the connection between the components 102 and 104, the drive device 192 illustrated in FIG. 5 and already described above in conjunction with the first embodiment of the inventive connecting means is used.

This drive device 192 is brought into the position illustrated schematically in FIG. 7 relative to the connecting means 300, in which the longitudinal axis of the driving magnet 206 is aligned essentially at right angles to the axis 322 of the outer sleeve 312 and thus of the magnetic element 350. The housing 194 of the drive device 192 is not illustrated in FIG. 7 for reasons of clarity.

The drive device 192 is preferably positioned such that it is at a greater distance from the second component 104 than the pressure helical spring 330 in the direction of the axis 322.

Subsequently, the electric motor 198 is switched due to actuation of the selector switch 208 of the drive device 192 into such an operating state, in which the shaft 204 of the driving magnet 206 turns in the counterclockwise direction (when seen in the direction of viewing of FIG. 7). As a result, the diametrically magnetized driving magnet 206 generates a driving magnetic field rotating in the same direction. In FIG. 7, the north pole (N), the south pole (S) and the direction of rotation of the driving magnetic field are illustrated schematically.

This driving magnetic field interacts with the magnetic element 350, the axially magnetized magnetic member 352 of which is magnetized, for example, such that the north pole (N) points to the left in the illustration of FIG. 7 and the south pole (S) of the magnetic element 350 points to the right in the illustration of FIG. 7.

In order to make it possible for the driving magnetic field to penetrate the interior of the outer sleeve 312, the outer sleeve 312 consists of a non-ferromagnetic material, for example, of brass.

Since the driving magnetic field is stronger at the location of the pole of the magnetic element 350 facing the pressure helical spring 330 than at the pole facing the unlocking sleeve 410, the influence on the pole (in the example: on the north pole) of the magnetic element 350 closer to the pressure helical spring 330 is decisive for the effect of the driving magnetic field on the magnetic element 410.

In the position of FIG. 7, this pole of the magnetic element 350 located closer to the drive device 192 has an equal pole of the driving magnet 206 located opposite it so that the driving magnetic field accelerates the magnetic element 350 away from the driving magnet 206 towards the unlocking sleeve 410 (to the right in the illustration of FIG. 7).

When it impinges on the end of the unlocking sleeve 410 facing the magnetic element 350 the momentum of the magnetic element 350 is transferred for the most part to the unlocking sleeve 410. The unlocking sleeve 410 consequently moves a certain distance towards the bolt head 382, wherein the wedge surfaces 402a and 402b of the locking tongues 400a and 400b, respectively, are pressed a certain distance radially inwards into the receiving slot 390 of the guide pin 388 by the edges of the windows 416a and 416b facing these wedge surfaces 402a and 402b, respectively.

The magnetic element 350 braked due to the impact on the unlocking sleeve 410 is accelerated by the driving magnetic field away from the unlocking sleeve 410 towards the pressure helical spring 330 as soon as the driving magnetic field has turned to such an extent that the attracting force of the south pole of the driving magnet 206 overcomes the repulsing force of the north pole of the driving magnet 206.

Once the end of the magnetic element 350 on the side of the helical spring has reached the free end of the pressure helical spring 330, the pressure helical spring 330 is pressed together by the magnetic element 350, wherein the movement energy which the magnetic element 350 has absorbed from the driving magnetic field is converted into elastic energy of the pressure helical spring 330.

Once the magnetic element 350 has come to rest at a point of reversal, it is accelerated again by the pressure helical spring 330 in the direction towards the unlocking sleeve 410, wherein the elastic energy of the pressure helical spring 330 is converted back into kinetic energy of the magnetic element 350. Moreover, in this phase the magnetic element 350 is accelerated in addition by the driving magnetic field since this has, in the meantime, turned further such that the poles of the magnetic element 350, on the one hand, and the driving magnet 206, on the other hand, which are located closest to one another, are again like poles which repulse one another.

The magnetic element 350 is moved linearly back and forth periodically between the pressure helical spring 330 and the unlocking sleeve 410 in the manner described above on account of the interaction with the rotating driving magnetic field generated by the driving magnet 206, wherein the magnetic element 350 transfers momentum to the unlocking sleeve 410 once in each period so that this can move bit by bit towards the bolt head 382.

Due to the fact that the magnetic element 350 can be accelerated by the driving magnetic field over an adequately large distance prior to each new impingement on the unlocking sleeve 410, a sledge hammer-like effect results, on the basis of which the unlocking sleeve 410 can also be moved towards the bolt head 382 contrary to a large resistance of the leaf spring elements 398a and 398b.

Finally, the unlocking sleeve 410 has been moved towards the bolt head 382 to such an extent that the locking surfaces 404a and 404b of the locking tongues 400a and 400b, respectively, disengage from the locking surface 324 of the step 320, as illustrated in FIG. 8.

In this position, the outer sleeve 312 and with it the first component 102 can be withdrawn from the stay bolt 374 and thus from the second component 104 without further ado and so this position of the locking elements 396a and 396b effective as retaining part corresponds to the release position thereof.

To release the connection between the two components 102 and 104, the rotational speed of the electric motor 198, and with it the rotational frequency of the driving magnetic field, is preferably set such that the momentum transferred to the magnetic element 350 during each period of the reciprocating movement thereof is at a maximum.

If the rotational frequency of the driving magnetic field is too low, the magnetic element 350 is not accelerated sufficiently to obtain a large momentum transferable to the unlocking sleeve 410.

If, on the other hand, the rotational frequency of the driving magnetic field is too high, the magnetic element 350 merely performs oscillations of a small amplitude about a resting point located close to the unlocking sleeve 410. In this case, the magnetic element 350 no longer reaches the pressure helical spring 330 during its periodic movement, and no adequate acceleration path is available for an adequate acceleration of the magnetic element 350 towards the unlocking sleeve 410.

There is a rotational frequency of the driving magnetic field between the two extremes described above which is designated in the following as resonance frequency, with which the momentum transferable from the driving magnetic field to the magnetic element 350 is at a maximum. In this resonance case, the frequency of the oscillating back and forth movement of the magnetic element 350 within the outer sleeve 312 corresponds to the rotational frequency of the driving magnetic field.

Since the resonance frequency defined above for releasing the second embodiment 300 of the inventive connecting means will not, as a rule, correspond to the resonance frequency for releasing the embodiment 100 of the inventive connecting means described above, the selector switch 208 of the drive device 192 preferably has a third operating position, with which a rotational speed of the electric motor 198 is associated which is allocated to the resonance frequency for releasing the second embodiment 300 of the inventive connecting means. In this way it is possible, with one and the same drive device 192, to release connections between the components 102 and 104 which have been established not only by means of the first embodiment 100 but also by means of the second embodiment 300 of the inventive connecting means.

Furthermore, it may be provided for the drive device 192 to have additional operating states with additional rotational speeds of the electric motor 198 which are each associated with embodiments of the connecting means 100 or 300 which differ from one another and are differentiated with respect to their respective resonance frequencies.

Finally, it may also be provided for the rotational speed of the electric motor to be infinitely variable in order to be able to set any optional resonance frequencies.

A third embodiment of an inventive connecting means designated as a whole as 500 will be described in the following with reference to FIG. 11 and FIG. 12.

As is apparent in FIG. 11, a first connecting element 570 of the connecting means 500 comprises a hollow cylindrical outer sleeve 512 which consists of a non-ferromagnetic material, for example, of brass and is turned into a cylindrical bore 510 in the first component 102 with an external thread (not illustrated for reasons of clarity).

The casing wall 514 of the outer sleeve 512 has a thinner, rear section 516, i.e. facing away from the contact surface 106 of the first component 102 in the assembled state, and a thicker front section 518, i.e. facing the contact surface 106 of the first component 102.

The transition between the rear section 516 and the front section 518 is formed by a step-like shoulder 520.

A front end wall 523 of an iron core 524 abuts on the shoulder 520 and its rear end wall 526 closes an end of the outer sleeve 512 facing away from the contact surface 106 of the first component 102.

The iron core 524 is secured on the outer sleeve 512 by way of a pressure fit, by soldering, welding, by means of a screw connection or in any other suitable manner.

A central area 528 of the iron core 524 which is arranged between the front end wall 523 and the rear end wall 526 and has a smaller diameter than the end walls 523 and 526 is surrounded by the windings of a coil 530 consisting of a material which is a good electrical conductor, for example, of copper.

The two ends of the coil wire are each connected to an end of a helical heating filament 532 which surrounds a bimetallic thermal element 534 extending parallel to the axis 522 of the outer sleeve 512 (cf. FIG. 12). The bimetallic thermal element 534 consists of a first layer 536 (upper layer in the illustration of FIGS. 11 and 12) consisting of a material with a comparatively large coefficient of thermal expansion and of a second layer 538 (lower layer in the illustration of FIGS. 11 and 12) consisting of a material with a comparatively small coefficient of thermal expansion.

For example, an invar alloy (36% by weight of nickel, the rest iron) can be used as material for the second layer 538 whereas an iron-manganese alloy supplemented with copper and nickel can be used as material for the first layer 536.

The bimetallic thermal element 534 is secured at one end in a blind-end bore 540 opening on the front end wall 523 of the iron core 524.

A free, second end of the bimetallic thermal element 534 is provided with a locking tongue 600 projecting radially outwards from the first layer 536. The locking tongue 600 has a locking surface 604 facing the iron core 524 and an inclined surface 602 facing away from the iron core 524.

A second connecting element 572 of the connecting means 500 comprises a stay bolt 574, the shaft 578 of which is turned into a cylindrical bore 580, which opens on the main surface 108 of the second component 104, by means of an external thread (not illustrated for reasons of clarity).

An essentially cylindrical bolt head 582 of the stay bolt 574 abuts on the main surface 108 of the second component 104 in the assembled state.

On its front end side 584 facing away from the shaft 578 the bolt head 582 is provided with a recess 586 which is coaxial to the longitudinal axis of the stay bolt 574 and comprises an entry section 588 opening on the front end side 584 and a receiving section 590 adjoining the entry section 588 on the side thereof facing away from the front end side 584.

An annular, front boundary surface of the entry section 588 serves as locking surface 592 of the stay bolt 574, as will be explained in greater detail in the following.

To establish a releasable connection between the two components 102 and 104 by means of the connecting means 500, the procedure is as follows:

The cylindrical bore 510 is produced in the first component 102 with the aid of a suitable drill. The outer sleeve 512 is turned into the cylindrical bore 510 by means of a suitable tool, for example, a screw driver until a front end face of the outer sleeve 512 is flush with the contact surface 106.

In order to facilitate the turning of the outer sleeve 512 into the cylindrical bore 510, the outer sleeve 512 is provided at its front end with a radially extending slot (not illustrated), into which the tool can engage.

The cylindrical bore 580 is produced in the second component 104 with the aid of a suitable drill, and the stay bolt 574 is turned into the cylindrical bore 580 by means of a suitable tool, for example, a screw driver until the bolt head 582 abuts on the main surface 108 of the second component 104.

In order to facilitate the turning of the stay bolt 574 into the cylindrical bore 580, the bolt head 582 has at its front end side 584 a radially extending slot (not illustrated), into which the tool can engage.

To establish the connection between the two components 102 and 104 these are subsequently moved relative to one another such that the bolt head 582 dips into the interior of the outer sleeve 512. The first component 102 is then moved further towards the second component 104 along the axis 522 of the outer sleeve 512 until the inclined surface 602 butts on the front side of the locking tongue 600 on an inclined run-in surface 594 formed on the front side of the bolt head 582.

If the outer sleeve 512 is now moved further along its axis 512 relative to the stay bolt 574 (to the right in the illustration of FIG. 11), the locking tongue 600 slides along the inclined run-in surface 594 of the bolt head 582 radially inwards, wherein the bimetallic thermal element 534 is elastically bent.

When the movement of the outer sleeve 512 relative to the stay bolt 574 is continued, the locking tongue 600 first remains in this bent position due to contact with the boundary wall of the entry section 588 until the locking tongue 600 completely enters the receiving section 590 of the recess 586, the bimetallic thermal element 534 can return to its non-tensioned, non-curved position and the locking surface 604 of the locking tongue 600 engages with the locking surface 592 of the receiving section 590.

In this position (illustrated in FIGS. 11 and 12) the bimetallic thermal element 534 prevents any relative movement of the first connecting element 570 and the second connecting element 572 along the direction of the axis 522 by locking with the bolt head 582; the bimetallic thermal element 534 thus acts as a retaining part of the connecting means 500.

The traction forces of the connection between the components 102 and 104 acting along the direction of connection (axis 522) are transferred due to the contact between the locking surface 592 of the bolt heat 582, on the one hand, and the locking surface 604 of the bimetallic thermal element 534, on the other hand.

The shearing forces of the connection are transferred due to areal contact between the inner side of the front section 518 of the outer sleeve 512, on the one hand, and the circumferential surface of the bolt head 582, the outer diameter of which essentially corresponds to the inner diameter of the front section 518, on the other hand.

To release the connection between the components 102 and 104 established by the connecting means 500, the procedure is as follows:

A driving coil 598 provided with an iron core 596 is positioned relative to the connecting means 500 such that the coil axis 600 of the driving coil 598 is aligned essentially parallel to the axis 522 of the outer sleeve 512.

In this respect, the distance between the driving coil 598 and the coil 530 arranged within the outer sleeve 512 is kept as small as possible.

Subsequently, the driving coil 598 is connected to an electrical ac voltage so that the driving coil 598 generates a driving magnetic field variable with time.

This driving magnetic field variable with time generates in the coil 530 within the outer sleeve 512 due to induction an electrical ac current which also flows through the helical heating filament 532.

On account of its ohmic resistance the helical heating filament 532 generates heat which it passes to the bimetallic thermal element 534 so that its temperature is increased.

During this increase in temperature, the first layer 536 and the second layer 538 of the bimetallic thermal element 534 experience axial longitudinal expansions differing from one another and so the bimetallic thermal element 534 is curved in such a manner that the locking tongue 600 is disengaged from the locking surface 592 of the receiving section 590 in the bolt head 582.

In the release position thus reached, the bimetallic thermal element 534 acting as retaining part allows a relative movement of the first connecting element 570 and the second connecting element 572 along the axis 522; this position thus corresponds to the release position of the retaining part.

In this release position, the first component 102 and the second component 104 can be moved away from one another without further ado.

The driving coil 598 provided with the iron core 596 can also be used to establish the connection between the components 102 and 104 by means of the connecting means 500. In this respect, an induction current is generated by the coil 530 and the helical heating filament 532 in the manner described above before the components 102 and 104 are brought together so that the bimetallic thermal element 534 is heated up and curves radially inwards. In this curved position the bimetallic thermal element 534 can easily be pushed into the recess 586. During subsequent cooling, the bimetallic thermal element 534 straightens such that the locking surface 604 of the locking tongue 600 engages with the locking surface 592 of the receiving section 590 and the first connecting element 570 and the second connecting element 572 are locked to one another.

What is claimed is:

1. Connecting means for releasably connecting a first component and a second component, comprising:
    a first connecting element adapted to be arranged on the first component and
    a second connecting element adapted to be arranged on the second component, wherein:
   at least one of the connecting elements comprises a connecting part projecting beyond an outer surface of an associated component when said connecting element is arranged on said component,
   the first connecting element and the second connecting element are releasably connected to one another in a connected state of the components and one of the connecting elements comprises a retaining part interacting with the other one of the connecting elements in a retaining position such that any relative movement of the first connecting element and the second connecting element along a direction of connection is prevented and allowing a relative movement of the first connecting element and the second connecting element along the direction of connection in a release position, and
   the retaining part is movable from at least one of:
     (1) the retaining position into the release position; or
     (2) the release position into the retaining position,
       via an external driving magnetic field provided outside the connecting means.

2. Connecting means as defined in claim 1, wherein the driving magnetic field is a rotating driving magnetic field.

3. Connecting means as defined in claim 1, wherein the driving magnetic field has an amplitude variable with time.

4. Connecting means as defined in claim 1, wherein the retaining part is movable directly as a result of interaction of the retaining part with the driving magnetic field.

5. Connecting means as defined in claim 1, wherein the connecting means further comprises a coupling means, the retaining part being movable as a result of a magnetic interaction of said coupling means with the driving magnetic field.

6. Connecting means as defined in claim 5, wherein the coupling means comprises a unit for generating an induction current as a result of interaction with the driving magnetic field.

7. Connecting means as defined in claim 6, wherein the coupling means comprises a heating element adapted to be fed with the induction current.

8. Connecting means as defined in claim 7, wherein the retaining part comprises an element, deformable due to temperature variation.

9. Connecting means as defined in claim 5, wherein the coupling means comprises a magnetic element drivable by the driving magnetic field to perform a movement within the connecting means.

10. Connecting means as defined in claim 9, wherein the retaining part is drivable directly as a result of interaction of the retaining part with the magnetic element.

11. Connecting means as defined in claim 9, wherein the magnetic element is drivable to perform a rotary movement.

12. Connecting means as defined in claim 11, wherein the magnetic element is drivable to perform an oscillating rotary movement.

13. Connecting means as defined in claim 12, wherein the magnetic element traverses, during the oscillating rotary movement, an angle which is greater than approximately 90°.

14. Connecting means as defined in claim 12, wherein a rotary angle traversed by the magnetic element during the oscillating rotary movement is greater than approximately 150°.

15. Connecting means as defined in claim 9, wherein the magnetic element comprises a permanent magnet magnetized transversely to the longitudinal axis of the magnetic element.

16. Connecting means as defined in claim 9, wherein the coupling means comprises an unlocking element movable into an unlocking position as a result of interaction with the magnetic element, wherein the retaining part is in the release position when the unlocking element is in the unlocking position.

17. Connecting means as defined in claim 9, wherein the magnetic element is drivable to perform a linear movement.

18. Connecting means as defined in claim 17, wherein the magnetic element is drivable to perform a linear reciprocating movement.

19. Connecting means as defined in claim 9, wherein the magnetic element comprises a permanent magnet magnetized essentially parallel to the longitudinal axis of the magnetic element.

20. Connecting means as defined in claim 9, wherein the coupling means comprises an elastic element for reversing the direction of movement of the magnetic element.

21. Connecting means as defined in claim 1, wherein the retaining part comprises a shaft with a thread.

22. Connecting means as defined in claim 1, wherein the retaining part comprises a locking tongue.

23. Connecting means as defined in claim 1, wherein the connecting elements are adapted to be secured in the first component and in the second component, respectively, such that outer surfaces of these components abut on one another in the connected position.

24. Connecting means as defined in claim 1, wherein one of the connecting elements has a receiving means, the other connecting element dipping into said receiving means at least partially in the connected position.

25. Connecting means as defined in claim 24, wherein the other connecting element abuts areally on an inner wall of the receiving means in the connected position, wherein a normal to surface of the inner wall is aligned transversely to the direction of connection.

26. Connecting means as defined in claim 1, wherein:
   the connecting element comprising the connecting part further comprises an anchoring part anchored in the associated component in an assembled state, and
   the connecting part has a smaller extension in the direction of connection than the anchoring part.

27. Connecting means for releasably connecting a first component and a second component, comprising:
   a first connecting element adapted to be arranged on the first component and
   a second connecting element adapted to be arranged on the second component,
   wherein:
     the first connecting element and the second connecting element are releasably connected to one another in a connected state of the components and one of the connecting elements comprises a retaining part interacting with the other one of the connecting elements in a retaining position such that any relative movement of the first connecting element and the second connecting element along a direction of connection is prevented and allowing a relative movement of the first connecting element and the second connecting element along the direction of connection in a release position,
     the retaining part is movable from the retaining position into the release position via a first external driving magnetic field provided outside the connecting means, and
     the retaining part is spring mounted in one of the connecting elements.

28. Method for releasably connecting a first component with a first connecting element arranged thereon, and a second component with a second connecting element arranged thereon, said first connecting element and said second connecting element forming a connecting means, said method comprising:

providing, as part of one of the connecting elements, a connecting part projecting beyond an outer surface of an associated component when said connecting element is arranged on said component, providing as part of one of the connecting elements a retaining part for interacting with the other one of the connecting elements in a retaining position such that any relative movement of the first connecting element and the second connecting element along a direction of connection is prevented, and moving the retaining part from the retaining position into a release position for releasing the connection, the retaining part allowing a relative movement of the first connecting element and the second connecting element along the direction of connection in said release position, wherein the retaining part is moved from the retaining position into the release position by means of a first external driving magnetic field acting on the connecting means from outside the connecting means.

29. Method as defined in claim 28, further comprising the step of:

establishing the connection between the first component and the second component by moving the retaining part from the release position into the retaining position via a second external driving magnetic field.

30. Method as defined in claim 28, wherein the driving magnetic field is a rotating driving magnetic field.

31. Method as defined in claim 28, wherein the driving magnetic field has an amplitude variable with time.

32. Method as defined in claim 28, wherein the retaining part is moved directly as a result of interaction of the retaining part with the driving magnetic field.

33. Method as defined in claim 28, wherein the retaining part is moved as a result of a magnetic interaction of the driving magnetic field with a coupling means.

34. Method as defined in claim 33, wherein an induction current is generated as a result of interaction of the coupling means with the driving magnetic field.

35. Method as defined in claim 34, wherein a heating element is fed with the induction current.

36. Method as defined in claim 35, wherein the retaining part is deformed at least partially due to a change in temperature.

37. Method as defined in claim 33, wherein a magnetic element is driven by means of the driving magnetic field to perform a movement within the connecting means.

38. Method as defined in claim 37, wherein the movement of the retaining part is driven directly as a result of interaction of the retaining part with the magnetic element.

39. Method as defined in claim 37, wherein the magnetic element is driven to perform a rotary movement.

40. Method as defined in claim 39, wherein the magnetic element is driven to perform an oscillating rotary movement.

41. Method as defined in claim 40, wherein the rotary angle covered by the magnetic element during the oscillating rotary movement is more than approximately 90°.

42. Method as defined in claim 37, wherein the magnetic element is driven as a result of interaction of the driving magnetic field with a permanent magnet magnetized transversely to the longitudinal axis of the magnetic element.

43. Method as defined in claim 37, wherein an unlocking element is moved into an unlocking position as a result of interaction with the magnetic element, wherein the retaining part is located in the release position when the unlocking element is in the unlocking position.

44. Method as defined in claim 37, wherein the magnetic element is driven to perform a linear movement.

45. Method as defined in claim 44, wherein the magnetic element is driven to perform a linear reciprocating movement.

46. Method as defined in claim 37, wherein the magnetic element is driven as a result of interaction of the driving magnetic field with a permanent magnet magnetized essentially parallel to the longitudinal axis of the magnetic element.

47. Method as defined in claim 37, wherein the direction of the magnetic element is reversed by means of an elastic element.

48. Method as defined in claim 28, wherein the retaining part is screwed to the other connecting element by means of a thread, preferably an external thread.

49. Method as defined in claim 28, wherein the retaining part is locked to the other connecting element by means of a locking tongue.

50. Method as defined in claim 28, wherein the retaining part is spring mounted in one of the connecting elements.

51. Method as defined in claim 28, wherein the connecting elements are secured in position in the first component and in the second component, respectively, such that outer surfaces of these components abut on one another in the connected position.

52. Method as defined in claim 28, wherein one of the connecting elements dips into a receiving means of the other connecting element in the connected position.

53. Method as defined in claim 52, wherein the connecting element dipping into the receiving means abuts areally on an inner wall of the receiving means in the connected position, wherein a normal to surface of the inner wall is aligned transversely to the direction of connection.

54. Method as defined in claim 28, wherein at least one of the connecting elements is anchored in an associated component by means of an anchoring part, wherein the anchoring part has a greater extension in the direction of connection than a connecting part of the connecting element projecting in the assembled state beyond an outer surface of the associated component.

55. Method as defined in claim 28, wherein the driving magnetic field variable with time is generated by means of a transportable drive device.

56. Method as defined in claim 28, wherein a rotating driving magnetic field is generated.

57. Method as defined in claim 28, wherein a periodically variable driving magnetic field is generated with a frequency corresponding essentially to a resonance frequency of a coupling means of the connecting means, the retaining part being moved as a result of the interaction of said means with the driving magnetic field.

58. An assembly set including (i) connecting means for the releasable connection of a first component and a second component and (ii) a drive device for said connecting means, said connecting means comprising:

a first connecting element adapted to be arranged on the first component and a second connecting element adapted to be arranged on the second component, wherein:

at least one of the connecting elements comprises a connecting part projecting beyond an outer surface of an associated component when said connecting element is arranged on said component, the first connecting element and the second connecting element are releasably connected to one another in a connected state of the components and one of the connecting elements comprises a retaining part interacting with the other one of the connecting elements in said connected state such that any relative movement of the first connecting element and the second connecting element along a direction of connection is prevented, a relative movement of the first connecting element and the second connecting element is possible along the direction of connection in a release position, and the retaining part is movable from the retaining position into the release position via an external driving magnetic field provided outside the connecting means; and said drive device comprising:

means for generating said driving magnetic field in a manner specifically adapted to selectively move said retaining part from said retaining position to said release position while acting on the connecting elements from outside the connecting means.

59. Connecting means as defined in claim 9, wherein said element comprises a bimetallic strip.

* * * * *